US009725789B2

(12) United States Patent
Nam et al.

(10) Patent No.: US 9,725,789 B2
(45) Date of Patent: Aug. 8, 2017

(54) APPARATUS FOR MANUFACTURING COMPOUND POWDER, METHOD OF MANUFACTURING IRON-BORON COMPOUND POWDER BY USING THE APPARATUS, BORON ALLOY POWDER MIXTURE, METHOD OF MANUFACTURING THE BORON ALLOY POWDER MIXTURE, COMBINED POWDER STRUCTURE, METHOD OF MANUFACTURING THE COMBINED POWDER STRUCTURE, STEEL PIPE, AND METHOD OF MANUFACTURING THE STEEL PIPE

(75) Inventors: Kee-Seok Nam, Gyeongsangnam-do (KR); Jung-Dae Kwon, Gyeongsangnam-do (KR); Jong-Joo Rha, Gyeongsangnam-do (KR); Hee-Chan Ahn, Gyeongsangnam-do (KR); Tae-Su Lim, Gyeongsangnam-do (KR)

(73) Assignee: KMT CO., LTD., Gyeongsangnam-do (KR)

( * ) Notice: Subject to any disclaimer, the term of this patent is extended or adjusted under 35 U.S.C. 154(b) by 621 days.

(21) Appl. No.: 14/124,824

(22) PCT Filed: Jun. 8, 2012

(86) PCT No.: PCT/KR2012/004575
§ 371 (c)(1),
(2), (4) Date: Dec. 9, 2013

(87) PCT Pub. No.: WO2012/169847
PCT Pub. Date: Dec. 13, 2012

(65) Prior Publication Data
US 2014/0096858 A1    Apr. 10, 2014

(30) Foreign Application Priority Data

Jun. 10, 2011    (KR) .................. 10-2011-0055915
Aug. 11, 2011    (KR) .................. 10-2011-0080056
Oct. 14, 2011    (KR) .................. 10-2011-0104909
May 3, 2012    (KR) .................. 10-2012-0047090

(51) Int. Cl.
| | |
|---|---|
| B22F 9/20 | (2006.01) |
| C22C 1/00 | (2006.01) |
| F16L 9/14 | (2006.01) |
| F16L 57/06 | (2006.01) |
| F16L 58/08 | (2006.01) |
| F16L 9/02 | (2006.01) |
| C22C 38/00 | (2006.01) |
| C22C 38/02 | (2006.01) |
| C22C 38/32 | (2006.01) |
| C22C 38/34 | (2006.01) |
| C22C 38/36 | (2006.01) |
| B22F 9/22 | (2006.01) |

(Continued)

(52) U.S. Cl.
CPC .................. *C22C 1/00* (2013.01); *B22F 9/20* (2013.01); *B22F 9/22* (2013.01); *C22C 32/0047* (2013.01); *C22C 32/0073* (2013.01); *C22C 33/0207* (2013.01); *C22C 38/002* (2013.01); *C22C 38/02* (2013.01); *C22C 38/32* (2013.01); *C22C 38/34* (2013.01); *C22C 38/36* (2013.01); *F16L 9/02* (2013.01); *F16L 9/14* (2013.01); *F16L 57/06* (2013.01); *F16L 58/08* (2013.01); *C22C 1/045* (2013.01); *C22C 1/0433* (2013.01); *C22C 1/1084* (2013.01); *C22C 33/0228* (2013.01); *C22C 33/0292* (2013.01)

(58) Field of Classification Search
None
See application file for complete search history.

(56) References Cited

U.S. PATENT DOCUMENTS 3,661,556 A * 5/1972 Jolley ..................... H01F 1/065
148/105
4,217,141 A * 8/1980 Schrittwieser .......... C22C 26/00
419/10

(Continued)

FOREIGN PATENT DOCUMENTS

| JP | 2003-130548 | 5/2003 |
| JP | 2001-059146 | 3/2011 |

OTHER PUBLICATIONS

Ozdemir, O. et al. "Hard Iron Boride (Fe2B) on 99.97wt.% Pure Iron." In: Vacuum, 2006, vol. 80, pp. 1391-1395.

(Continued)

*Primary Examiner* — Jessee Roe
*Assistant Examiner* — Ngoclan T Mai
(74) *Attorney, Agent, or Firm* — Mayer & Williams, PC; Stuart Mayer

(57) ABSTRACT

Provided are an apparatus for manufacturing a compound powder, a method of manufacturing an iron-boron compound powder by using the apparatus, a boron alloy powder mixture, a method of manufacturing the boron alloy powder mixture, a combined powder structure, a method of manufacturing the combined powder structure, a steel pipe, and a method of manufacturing the steel pipe The method of manufacturing the boron alloy powder mixture includes: preparing a mixed powder including a boron iron alloy powder and a target powder; heat-treating the mixed powder to boronize at least a portion of the target powder and de-boronize at least a portion of the boron iron alloy powder, thereby de-boronizing the boron iron alloy powder to reduce the melting point of the boron iron alloy powder.

8 Claims, 21 Drawing Sheets

(51) Int. Cl.
    *C22C 32/00*     (2006.01)
    *C22C 33/02*     (2006.01)
    *C22C 1/04*     (2006.01)
    *C22C 1/10*     (2006.01)

(56) References Cited

U.S. PATENT DOCUMENTS 4,235,630 A * 11/1980 Babu .................. C22C 32/0073
    148/423
2005/0109430 A1* 5/2005 Naito .................. C04B 35/6262
    148/513

OTHER PUBLICATIONS

Casadesus, P. et al. "Bonding with a Thermally Unstable Gas(Diborane)." In: Metallurgical Trans. A, 1979, vol. IOA, pp. 1739-1743.
Ivanov, S. et al. "Influence of the Comparison of the Boroning Mixture on the Dimension Change of Pressed and Boroned Samples from Iron Powder." In: Sci. Sintering, 2008, vol. 40, pp. 197-205.

* cited by examiner (a)

(b)

(c)

(a)

(b)

(c)

APPARATUS FOR MANUFACTURING COMPOUND POWDER, METHOD OF MANUFACTURING IRON-BORON COMPOUND POWDER BY USING THE APPARATUS, BORON ALLOY POWDER MIXTURE, METHOD OF MANUFACTURING THE BORON ALLOY POWDER MIXTURE, COMBINED POWDER STRUCTURE, METHOD OF MANUFACTURING THE COMBINED POWDER STRUCTURE, STEEL PIPE, AND METHOD OF MANUFACTURING THE STEEL PIPE

TECHNICAL FIELD

The present invention relates to an apparatus for manufacturing compound powder, a method of manufacturing the compound powder by using the apparatus, and in particular, to an apparatus and method for manufacturing iron-boron compound powder by boronizing iron powder.

The present invention relates to a powder mixture manufactured by mixing different powders and a method of manufacturing the same, and in particular, to a powder mixture manufactured by mixing a boron iron alloy powder and a target powder and a method of manufacturing the powder mixture.

The present invention relates to a combined powder structure manufactured by mixing different powders and a method of manufacturing the same, and in particular, to a combined powder structure manufactured by combining a boron iron alloy powder and a target powder and a method of manufacturing the combined powder structure.

The present invention relates to a steel pipe formed by mixing different powders and a method of forming the same, and in particular, to a steel pipe manufactured by combining a boron iron alloy powder and a boronized target powder in a powder mixture and a method of manufacturing the steel pipe.

The present invention relates to a steel pipe having an inner surface coated with different powders that are mixed, heated, melted, and hardened and a method of manufacturing the steel pipe, and in particular, to a steel pipe having an inner surface coated with a coating layer having excellent wearing resistance, heat-resistance, and corrosion resistance property, wherein the coating layer is formed by heating either a powder mixture that includes boron alloy powder consisting of a de-boronized boron iron alloy powder and a boronized target powder or a powder mixture that includes the boron alloy powder acting as a binder, and chromium iron alloy powder as a reinforcing agent and partly or completely solidifying the powder mixture.

BACKGROUND ART

In general, an wearing resistance composite is formed by dispersing ceramic powder having high hardness and high wearing resistance as a hardening phase in a matrix formed of metal. For use as such ceramic powder, various high-hardness powders, such as tungsten carbide (WC), titanium carbide (TiC), or titanium boride ($TiB_2$), are used. However, these powders are costly, and they are difficult to be uniformly distributed in a metal matrix because of large difference in specific gravity with respect to the metal matrix when they are used to form a composite by using gravity casting or centrifugation casting. In addition, the binding force of these powders with respect to the metal matrix is not sufficiently enough due to their low adhesion.

In order to manufacture metallic parts or high-hardness metal-ceramic composite parts having high wearing resistance property or high corrosion resistance property using by casting or sintering, different powders may be combined each other to form a combined powder structure. To obtain excellent properties of the combined powder structure, powders are required to have an high binding force to bind each other. To obtain the high binding force, the contact area between the powders is partially melted, thereby the powders are combined each other. In the case of high-hardness ceramic composite materials, metal powder having a low melting point can be used as a binder to combine high-hardness ceramic powders.

Iron-boron binary compound may be used for a high-hardness ceramic powder used as a reinforcing agent or used to form a combined powder structure.

Iron-boron binary compound may be used as a reinforcing agent or as a high-hardness ceramic powder to form a combined powder structure. The iron-boron binary compound may be FeB or $Fe_2B$ according to the boron content. In detail, when the boron content is 8.83 weight %, the $Fe_2B$ compound having a melting point of 1389° C. may be formed, while when the boron content is 16.23 weight %, the FeB compound having a melting point that is higher than 1650° C. may be formed. In addition, when the boron content is 3.8 weight %, the iron-boron binary compound has the lower melting point of 1177° C. From among these, the $Fe_2B$ has a specific gravity of 7.3 $g/cm^3$ and a hardness value of HK 1800 to 2000, and the FeB has a specific gravity of 7.0 $g/cm^3$ and a hardness value of HK 1900 to 2100. In other words, the $Fe_2B$ and the FeB have both very high hardness property, excellent self fluxing property and adhesion property. Furthermore, since the specific gravity of an iron-boron compound is about 7.5 $g/cm^3$, which is similar to that of iron-based metal, they are very suitable for manufacturing a metal composite including an iron-based metal matrix material by using gravitational casting or centrifugation casting.

DETAILED DESCRIPTION OF THE INVENTION

Technical Problem

The present invention provides an apparatus for manufacturing compound powder and a method of manufacturing iron-boron compound powder having high hardness and excellent self-fluxing and adhesion properties.

The present invention provides a powder mixture and a method of manufacturing the powder mixture. The powder mixture is manufactured in such a way that a boron iron alloy powder and a target powder are mixed and heat treated so that the target powder is boronized and simultaneously the boron iron alloy powder is de-boronized, thereby reducing the melting point. This method is different from a conventional method in which high-hardness boride powder manufactured separately is mixed with metal powder having a low melting point, which acts as a binder.

The present invention provides a combined powder structure and a method of manufacturing the combined powder structure. The combined powder structure is manufactured in such a way that a boron iron alloy powder and a target powder are mixed and heat treated so that the target powder is boronized and simultaneously the boron iron alloy powder is de-boronized, thereby reducing the melting point. This method is different from a conventional method in which high-hardness boride powder manufactured separately is mixed with metal powder having a low melting point, which acts as a binder.

The present invention provides a steel pipe and a method of manufacturing the steel pipe. The steel pipe has an inner surface coated with a coating layer that has excellent wearing resistance, oxidation resistance, and corrosion resistance property and is manufactured by using the combined powder structure at low costs.

Technical Solution

According to an aspect of the present invention, there is provided a method of manufacturing an iron-boron compound powder, the method includes: rotating and heating a retort surrounded by a furnace body including a heating unit to react an iron powder and a boron source material loaded into the retort; separating the furnace body from an outer circumference surface of the retort; and rotating and cooling the retort.

An embodiment of the present invention, the iron powder may include pure iron powder.

An embodiment of the present invention, the iron powder may have a diameter in a range of 10 µm to 1000 µm.

An embodiment of the present invention, the retort may be heated at a temperature in a range of 850° C. to 1050° C.

An embodiment of the present invention, the boron source material may include a boron powder, a boron compound powder, and a ferro-boron powder.

An embodiment of the present invention, the boron compound powder may include a boron carbide ($B_4C$) powder or a boron oxide ($B_2O_3$) powder.

An embodiment of the present invention, an active powder may be further loaded into the retort, and then, the reaction between the iron powder and the boron source material is performed.

An embodiment of the present invention, the active powder may include at least one of $Na_3AlF_6$, $KBF_4$, $AlF_3$, NaCl, NaF, $CaF_2$, and $NH_4Cl$.

An embodiment of the present invention, in a powder mixture including the iron powder, the boron source material, and the active powder, an amount of the boron source material may be in a range of 5 weight % to 50 weight % and an amount of the active powder is in a range of 0.5 weight % to 10 weight %.

An embodiment of the present invention, an average diameter of the boron source material may be less than an average diameter of the iron powder.

An embodiment of the present invention, the boron source material may be a boron gas or a boron compound gas.

An embodiment of the present invention, the boron gas or the boron compound gas may be mixed with a carrier gas to form a mixed gas to be loaded.

An embodiment of the present invention, the boron compound gas may include any one of $B_2H_6$, $BF_3$, $BCl_3$, $BI_3$, $BBr_3$, $(CH_3)_3B$, and $(C_2H_5)_3B$.

An embodiment of the present invention, an amount of the boron gas or the boron compound gas in the mixed gas may be in a range of 2 volume % to 40 volume %.

According to an aspect of the present invention, there is provided an apparatus for manufacturing a compound powder, the apparatus includes: a rotatable retort; and a furnace body including a frame surrounding the retort and a heating unit disposed inside the frame to heat the retort.

An embodiment of the present invention, the furnace body may include a plurality of part furnace bodies that are separable from each other and respectively movable.

An embodiment of the present invention, the part furnace body may include: a first part furnace body including a first subframe disposed to surround a portion of an outer circumference surface of the retort and a first heating unit disposed inside the first subframe; and a second part furnace body including a second subframe disposed to a remaining portion of the outer circumference surface of the retort and a second heating unit disposed inside the second subframe.

According to an aspect of the present invention, there is provided a method of manufacturing a boron alloy powder mixture, the method includes: preparing a mixed powder including a boron iron alloy powder and a target powder; and heat treating the mixed powder to form a boronized region in the target powder by boronizing at least a portion of the target powder and to form a de-boronized region in the boron iron alloy powder by de-boronizing at least a portion of the boron iron alloy powder, thereby reducing the melting point of the boron iron alloy powder.

An embodiment of the present invention, a boron content in the boron iron alloy powder before the de-boronizing may be 17 atomic % or more.

An embodiment of the present invention, a boron content in the boron iron alloy powder after the de-boronizing may be in a range of 5 atomic % to 35 atomic %.

An embodiment of the present invention, a boron content in the boron iron alloy powder after the de-boronizing may be in a range of 10 atomic % to 25 atomic %.

An embodiment of the present invention, the de-boronizing may be performed until the target powder is completely boronized or the boron iron alloy powder is completely de-boronized.

An embodiment of the present invention, the target powder may include a metal that forms a solid solution with boron or that combines with boron to form a boron compound.

An embodiment of the present invention, the metal may be at least one selected from iron (Fe), titanium (Ti), chromium (Cr), zirconium (Zr), hafnium (Hf), vanadium (V), tantalium (Ta), molybdenum (Mo), nickel (Ni), cobalt (Co), aluminum (Al), silicon (Si), and tungsten (W).

An embodiment of the present invention, a melting point of the boronized region in the target powder may be less than a melting point of the target powder before the boronizing.

An embodiment of the present invention, an amount of the boron iron alloy powder in the mixed powder may be in a range of 5 weight % to 95 weight %.

An embodiment of the present invention, the mixed powder includes an active agent in the amount of 0.5 weight % to 20 weight %.

An embodiment of the present invention, the active agent may include at least one of $Na_3AlF_6$, $KBF_4$, $AlF_3$, NaCl, NaF, $CaF_2$, and $NH_4Cl$.

An embodiment of the present invention, the de-boronizing may be performed under an anti-oxidation atmosphere An embodiment of the present invention, the anti-oxidation atmosphere may be at least one of a nitrogen atmosphere, an argon atmosphere, a hydrogen atmosphere, and a vacuum atmosphere.

According to an aspect of the present invention, there is provided a boron alloy powder mixture includes: a boron iron alloy powder; and a target powder having at least a portion in which a boronized region is formed, wherein the boron iron alloy powder has at least a portion in which a de-boronized region is formed by the de-boronizing the boron iron alloy powder, wherein the de-boronized region has a reduced melting point caused by decreasing a boron content due to the de-boronizing.

An embodiment of the present invention, the target powder may be entirely boronized or the boron iron alloy powder may be entirely a de-boronized.

An embodiment of the present invention, the de-boronized region may be disposed on the surface of the boron iron alloy powder.

An embodiment of the present invention, the boron iron alloy powder may further include at least one of Si and C.

An embodiment of the present invention, the boronized region may be either a metal-boron solid solution or a boron compound of metal and boron.

An embodiment of the present invention, the metal may be at least one selected from iron (Fe), titanium (Ti), chromium (Cr), zirconium (Zr), hafnium (Hf), vanadium (V), tantalium (Ta), molybdenum (Mo), nickel (Ni), cobalt (Co), aluminum (Al), silicon (Si), and tungsten (W).

An embodiment of the present invention, a melting point of the boronized region may be lower than a melting point of the metal.

An embodiment of the present invention, the boronized region may be disposed on the surface of the target powder.

According to an aspect of the present invention, there is provided a method of manufacturing a combined powder structure, the method includes: heating a mixed powder including a de-boronized boron iron alloy powder and a boronized target powder to a predetermined temperature to combine the de-boronized boron iron alloy powder with the boronized target powder.

An embodiment of the present invention, the method may further include: preparing a mixed powder including a boron iron alloy powder and a target powder, and heat-treating the mixed powder to boronize at least a portion of the target powder and de-boronize at least a portion of the boron iron alloy powder, thereby reducing a melting point of the boron iron alloy powder.

An embodiment of the present invention, the method may further include: adding other powder to the de-boronized boron iron alloy powder and the boronized target powder to combine the other powder with at least one of the de-boronized boron iron alloy powder and the boronized target powder.

An embodiment of the present invention, the other powder may include a pure metal powder, an alloy powder, or a ceramic powder.

An embodiment of the present invention, the alloy powder may include a self-fluxing alloy powder.

An embodiment of the present invention, the ceramic powder may include at least one of a metal oxide, a metal carbide, a metal nitride, and a metal boride.

An embodiment of the present invention, the mixed powder may further include a borax such as $Na_2B_4O_7 \cdot 10H_2O$ An embodiment of the present invention, a boron content of the boron iron alloy powder before the de-boronizing may be 17 atomic % or more.

An embodiment of the present invention, a boron content in the boron iron alloy powder in the mixed powder after the de-boronizing may be in a range of 5 atomic % to 35 atomic %.

An embodiment of the present invention, a boron content of the boron iron alloy powder in the mixed powder after the de-boronizing may be in a range of 10 atomic % to 25 atomic %.

An embodiment of the present invention, the boron iron alloy powder may further include at least one of Si and C.

An embodiment of the present invention, the target powder may include a metal that forms a solid solution with boron or that combines with boron to form a boron compound.

An embodiment of the present invention, wherein the target powder may be at least one selected from iron (Fe), titanium (Ti), chromium (Cr), zirconium (Zr), hafnium (Hf), vanadium (V), tantalium (Ta), molybdenum (Mo), nickel (Ni), cobalt (Co), aluminum (Al), silicon (Si), and tungsten (W).

An embodiment of the present invention, a content of the boron iron alloy powder in the mixed powder may be in a range of 5 weight % to 95 weight %.

An embodiment of the present invention, the mixed powder includes an active agent in the amount of 0.5 weight % to 20 weight %.

An embodiment of the present invention, the active agent may include at least one of $Na_3AlF_6$, $KBF_4$, $AlF_3$, NaCl, NaF, $CaF_2$, and $NH_4Cl$.

An embodiment of the present invention, the de-boronizing may be performed in an anti-oxidation atmosphere.

An embodiment of the present invention, wherein the anti-oxidation atmosphere may be at least one of a nitrogen atmosphere, an argon atmosphere, a hydrogen atmosphere, and a vacuum atmosphere.

According to an aspect of the present invention, there is provided a combined powder structure includes: a target powder having at least a portion in which a boronized region is formed, and a boron iron alloy powder having at least a portion in which a de-boronized region is formed, wherein the boronized region and the de-boronized region combine with each other by meting and solidifying at least a portion of at least one of the boronized region and the de-boronized region, or by sintering the boronized region and the de-boronized region.

An embodiment of the present invention, the de-boronized region may be disposed on the surface of the boron iron alloy powder.

An embodiment of the present invention, the boron iron alloy powder may further include at least one of Si and C.

An embodiment of the present invention, the boronized region may be either a metal-boron solid solution or a boron compound of metal and boron.

An embodiment of the present invention, the metal may be at least one selected from iron (Fe), titanium (Ti), chromium (Cr), zirconium (Zr), hafnium (Hf), vanadium (V), tantalium (Ta), molybdenum (Mo), nickel (Ni), cobalt (Co), aluminum (Al), silicon (Si), and tungsten (W).

According to an aspect of the present invention, there is provided a method of manufacturing a steel pipe, the method includes: loading a powder mixture inside a steel pipe, wherein the powder mixture including a boron iron alloy powder having at least a portion in which a de-boronized region is formed and a target powder having at least a portion in which a boronized region is formed; and melting the powder mixture loaded inside the steel pipe by heating, and then solidifying the powder mixture to form a coating layer on an inner surface of the steel pipe.

An embodiment of the present invention, the melting and the solidifying the powder mixture may be performed in such a way that the steel pipe with the powder mixture loaded therein is heated and cooled while rotating.

An embodiment of the present invention, the loading the powder mixture inside the steel pipe may include: mixing a boron iron alloy powder and a target powder; and heat-treating the mixture of the boron iron alloy powder and the target powder to boronize at least a portion of the target powder to form the boronized region and simultaneously to de-boronize at least a portion of the boron iron alloy powder to form the de-boronized region.

An embodiment of the present invention, the boron iron alloy powder may further include at least one of silicon and carbon.

An embodiment of the present invention, the target powder may include at least one of iron (Fe), titanium (Ti), chromium (Cr), zirconium (Zr), hafnium (Hf), vanadium (V), tantalum (Ta), molybdenum (Mo), nickel (Ni), cobalt (Co), aluminum (Al), silicon (Si), and tungsten (W).

An embodiment of the present invention, a content of the boron iron alloy powder in the powder mixture may be in a range of 5 weight % to 95 weight %.

An embodiment of the present invention, average particle sizes of the boron iron alloy powder and the target powder may be in a range of 200 mesh to 20 mesh of ASTM standard sieves.

An embodiment of the present invention, the mixed powder inside the steel pipe may further include at least one of a chromium iron alloy powder and a flux.

An embodiment of the present invention, the chromium iron alloy powder may include 2 weight % or more of carbon and 50 weight % or more of chromium.

An embodiment of the present invention, an amount of the chromium iron alloy powder in the powder mixture may be in a range of 5 weight % to 95 weight %.

An embodiment of the present invention, the chromium iron alloy powder may further include at least one of iron, chromium, silicon, and carbon.

An embodiment of the present invention, an average particle size of the chromium iron alloy powder may be in a range of 200 mesh to 4 mesh of ASTM standard sieves.

An embodiment of the present invention, a rotation rate of the steel pipe may be in a range of 5G to 120G wherein G is represented by the following equation:

$$G = \text{centrifugal force/gravity force} = 5.6 \times 10^{-7} \times \text{inner diameter of steel pipe (mm)} \times (\text{the number of rotation (rpm)})^2.$$

An embodiment of the present invention, the chromium iron alloy powder may further include at least one of iron, chromium, silicon, and carbon. An embodiment of the present invention, an average particle size of the chromium iron alloy powder may be in a range of 200 mesh to 4 mesh of ASTM standard sieves. An embodiment of the present invention, a rotation rate of the steel pipe may be in a range of 5G to 120G wherein G is represented by the following equation: $G = \text{centrifugal force/gravity force} = 5.6 \times 10^{-7} \times$ inner diameter of steel pipe (mm)×(the number of rotation (rpm))$^2$.

An embodiment of the present invention, the heating may be performed by any one of gas combustion heating, electric resistance heating, and high-frequency induction heating.

An embodiment of the present invention, the heating may be performed at a heating temperature of 1000° C. to 1500° C.

According to an aspect of the present invention, there is provided a steel pipe, the steel pipe includes: a coating layer on an inner surface of the steel pipe, wherein the coating layer has a solidified structure formed by melting and solidifying a boron iron alloy powder and a target powder, wherein the boron iron alloy powder acts as a matrix metal or a binder and has at least a portion in which a de-boronized region is formed, wherein the target powder has at least a portion in which a boronized region is formed.

An embodiment of the present invention, the coating layer may further include a chromium iron alloy as a reinforcing agent.

An embodiment of the present invention, the reinforcing agent may include iron, 10 weight % to 80 weight % of chromium, 2 weight % to 10 weight % of carbon, and 2.5 weight % or less of silicon.

An embodiment of the present invention, the binder may include iron and boron, wherein the reinforcing agent includes at least one of iron, chromium, silicon, and carbon.

An embodiment of the present invention, the binder may have a boron content in a range of 5 atomic % to 35 atomic %.

An embodiment of the present invention, the coating layer may include at least one of iron, chromium, silicon, carbon, and boron.

An embodiment of the present invention, a boron content of the coating layer may be in a range of greater than 0 weight % to 10 weight % or less.

An embodiment of the present invention, a carbon content of the coating layer may be in a range of greater than 0 weight % to 10 weight % or less.

An embodiment of the present invention, a chromium content of the coating layer may be in a range of greater than 0 weight % to 60 weight % or less.

An embodiment of the present invention, a silicon content of the coating layer may be in a range of greater than 0 weight % to 2.5 weight % or less.

Advantageous Effects

When an apparatus and method for manufacturing iron-boron compound powder according to an embodiment of the present invention are used, iron-boron compound powder having high hardness and excellent self-fluxing and adhesion properties may be obtained.

A boron alloy powder mixture manufactured according to an embodiment of the present invention includes boron alloy powder mixture with a lower boron content cause by de-boronizing and decreasing in the boron content, the boron iron alloy powder may have a lower melting point. In addition, in some cases, a target powder in the powder mixture may have an increased hardness and a reduced melting point cause by boronizing and increasing the boron content. Accordingly, in the case of the boron alloy powder mixture according to an embodiment of the present invention, the de-boronized boron iron alloy powder and the boronized target powder are not separated, and these powders may be directly used, or other high-hardness compound powder is added thereto, and then, the result is heated at a relatively low temperature for use in the preparation of a high-hardness combined powder structure.

A combined powder structure manufactured according to an embodiment of the present invention includes a powder mixture including a boron iron alloy powder having a lower boron content due to de-boronizing and a target powder with a higher boron content due to boronizing, and the boron iron alloy powder may have a lower melting point due to the decrease in the boron content, and the target powder may have a higher hardness and a lower melting point due to the increase in the boron content caused by boronizing. Accordingly, in the case of the boron alloy powder mixture according to an embodiment of the present invention, the de-boronized boron iron alloy powder and the boronized target powder are not separated, and these powders may be directly used, or other high-hardness compound powder is added thereto and then, the result is heated at a relatively low temperature for use in the preparation of a high-hardness combined powder structure.

According to another embodiment of the present invention, a steel pipe having excellent wearing resistance, oxidation resistance and corrosion resistance properties and a method of manufacturing the steel pipe may be embodied at low costs. In addition, due to high hardening capability, very high hardness and strength may be obtained without a separate heat treatment.

The effects described above are exemplarily provided only for some embodiments, and do not limit the scope of the present invention.

BEST MODE

Figure 1:
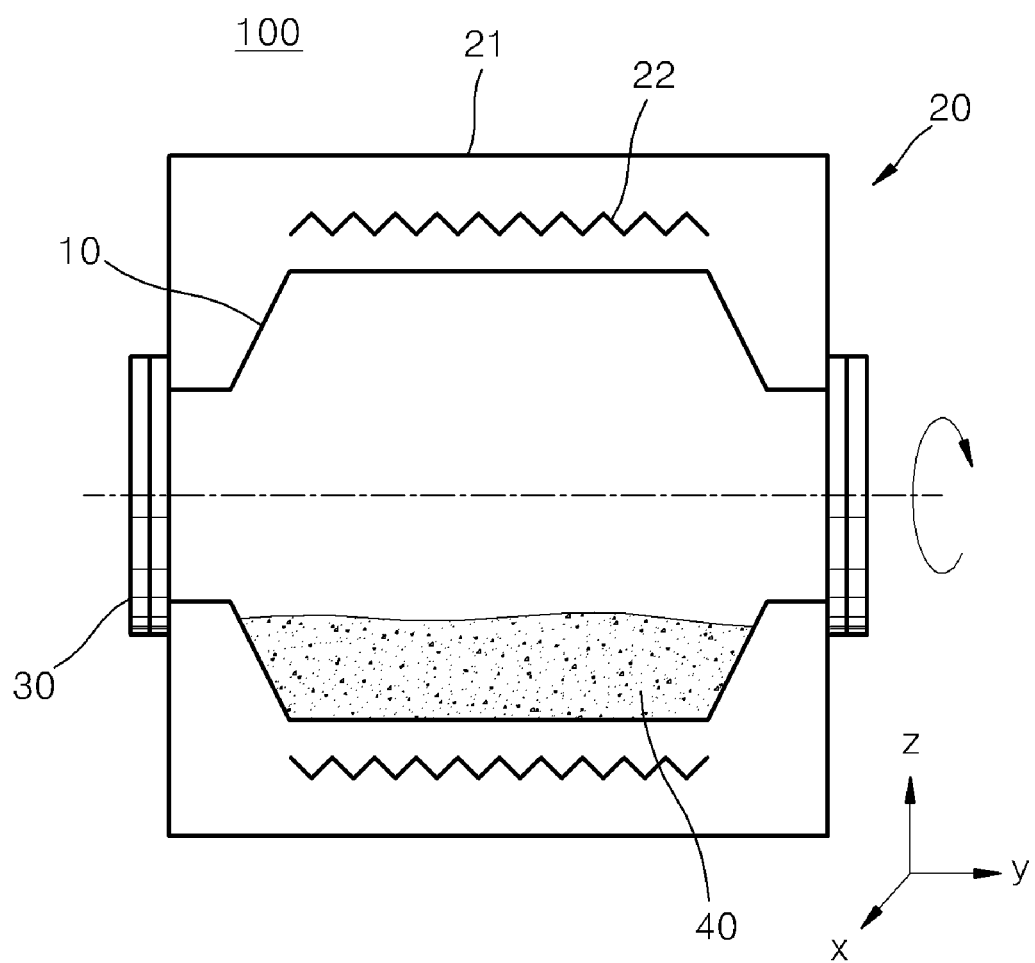
FIGS. 1 to 3 are schematic views of an apparatus for manufacturing a compound powder, according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In addition, for convenience of description, the sizes of elements in the drawings may be exaggerated for clarity.

In the following embodiments, the x axis, the y axis, and the z axis are not limited to the three axes in a rectangular coordinate system, and may be interpreted to include a more comprehensive meaning including the description provided above. For example, the x axis, the y axis, and the z axis may be perpendicular to each other, and may also indicate three different directions that are not perpendicular to each other, respectively.

The term "iron boron alloy" used herein may contain about 10 weight % or more of boron, and is a compound containing iron and boron and having a melting point of about 1450° C. or more, and may be called ferro-boron, an iron-boron alloy, or the like.

In addition, the term "target powder" used herein is powder that is to be boronized due to boron supplied from a boron iron alloy powder, and is to be mixed with the boron iron alloy powder to form a mixed powder.

In embodiments of the present invention, a boron iron alloy powder is a boron source material that supplies boron for boronizing a target powder and is de-boronized to reduce the boron content during boronizing the target powder. In addition, after the boronizing, the target powder may be used as a binder having a low melting point. The boronizing of the target powder performed by a boron iron alloy powder and the de-boronizing of the boron iron alloy powder may be performed in such a manner that the target powder and the boron iron alloy powder are mixed and then the mixture is heat-treated. Hereinafter, the heat treatment may also be named as a de-boronizing step or a de-boronizing process in view of the boron iron alloy powder.

The boron iron alloy powder that has at least a portion in which a de-boronized region is formed, which is referred to herein, refers to the boron iron alloy powder that has a lower melting point than a boron iron alloy powder in which the de-boronized region is not formed. Referring to the iron-boron phase diagram of FIG. 10, the melting point of iron is 1538° C. and the melting point of boron is 2092° C. When 64 atomic % of boron is added to iron, peritectic transformation may occur at a temperature of 1500° C., and when 17 atomic % of boron is added, the peritectic transformation may occur at a relatively low temperature of 1174° C. Accordingly, when the boron content in boron iron alloy is reduced from 50 atomic % to 17 atomic %, the melting point of ferro-boron may reduce from 1650° C. to 1174° C.

For example, when the initial boron content of the boron iron alloy powder is 50 atomic % and a de-boronized region having the boron content of 17 atomic % is formed on the surface of the boron iron alloy powder during de-boronizing, the formation of the de-boronized region may lead to a decrease in the melting point of the surface of the boron iron alloy powder from 1650° C. to 1174° C., thereby decreasing the melting temperature of about 480° C. Accordingly, the boron iron alloy powder that has at least a portion in which the de-boronized region is formed refers to a boron iron alloy powder that has a lower boron content than the initial boron content thereof.

In addition, the boron iron alloy powder may further include at least one of silicon (Si) or carbon (C), and in this case, due to de-boronizing, the melting point of the boron iron alloy powder may be further reduced to lower than 1174° C. A silicon content may be 5 weight % or less, and a carbon content may be 2 weight % or less.

Similarly, the forming of a boronized region in at least a portion of the target powder means that the target powder has a portion of which melting point is lower than the target powder not boronized. For example, referring to FIG. 10, when the target powder is pure iron powder, the target powder is boronized by the boron iron alloy powder and thus, the boron content thereof increases from 0 to 17 atomic %. The melting point of the target powder decreases from 1538° C. to a process temperature of 1174° C. which is an eutectic temperature. In addition, even when $Fe_2B$ as a boron compound is formed in the boronized region, the melting point of the target powder is reduced to 1389° C., which is lower than the melting point of pure iron of 1538° C.

The target powder is metal having affinity with boron, and such a metal may not be limited as long as the metal is combined with boron to form a boron compound. For example, the target powder may include at least one of iron (Fe), titanium (Ti), chromium (Cr), zirconium (Zr), hafnium (Hf), vanadium (V), tantalum (Ta), molybdenum (Mo), nickel (Ni), cobalt (Co), aluminum (Al), silicon (Si), and tungsten (W).

Embodiments of the present invention will be described in detail.

FIG. 1 is a cross-sectional view of an apparatus 100 for manufacturing a compound powder according to an embodiment of the present invention, which is perpendicular to an x direction. Referring to FIG. 1, the apparatus 100 includes a retort 10 and a furnace body 20 for heating the retort 10.

The retort 10 may have a hollow cylindrical pipe shape extending in a y direction. The retort 10 has an inner space in which a mixed powder 40 of two or more kinds of powders is loaded for manufacturing compound powder, and the mixed powder 40 is prevented from oxidation and sintering. The retort 10 uniformly mixes the loaded powders to form the mixed powder 40. The retort 10 may rotate with respect to a central line extending in the y axis direction as in the arrow direction illustrated in FIG. 1. The retort 10 has an end portion having a door 30 for loading the powders.

The furnace body 20 includes a frame 21 surrounding the retort 10 and a heating unit 22 disposed to heat the retort 10 in the frame 21. The heating unit 22 may be any one of various heating sources for generating heat that is to be supplied to an outer circumferential surface of the retort 10. An example of the heating unit may be an electric resistor heater, a high-frequency induction heater, or a halogen lamp.

Figure 2:
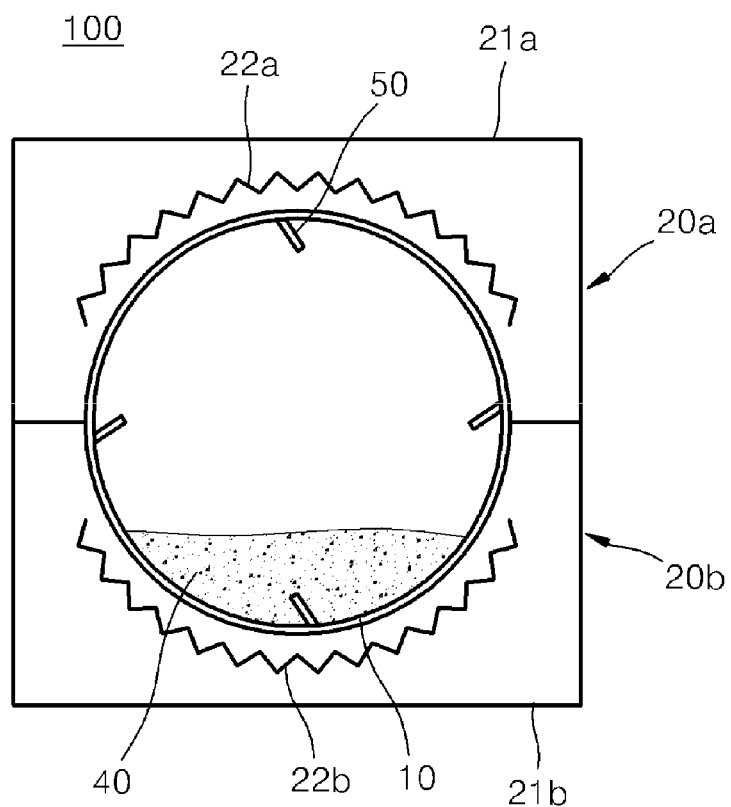

The furnace body 20 may have a plurality of part furnace bodies which are separable from each other and respectively movable. FIG. 2 is a cross-sectional view of the apparatus 100 including a plurality of part furnace bodies perpendicular to the extension direction of the retort 10 (that is, the y direction of FIG. 1).

For example, as illustrated in FIG. 2, the furnace body 20 may include two part furnace bodies such as a first part furnace body 20a and a second part furnace body 20b. The first part furnace body 20a includes a first subframe 21a disposed to surround a portion of the outer circumference surface of the retort 10 and a first heating unit 22a disposed inside the first subframe 21a. The second part furnace body 20b includes a second subframe 21b disposed to surround the remaining outer circumference surface of the retort 10 and a second heating unit 22b disposed inside the second subframe 21b.

As illustrated in FIG. 2, the first part furnace body 20a may be disposed above the retort 10 and the second part furnace body 20b may be disposed under the retort 10, but the present invention is not limited thereto. For example, the first part furnace body and the second part furnace body may be respectively disposed in the left and right sides of the retort 10.

Figure 3:
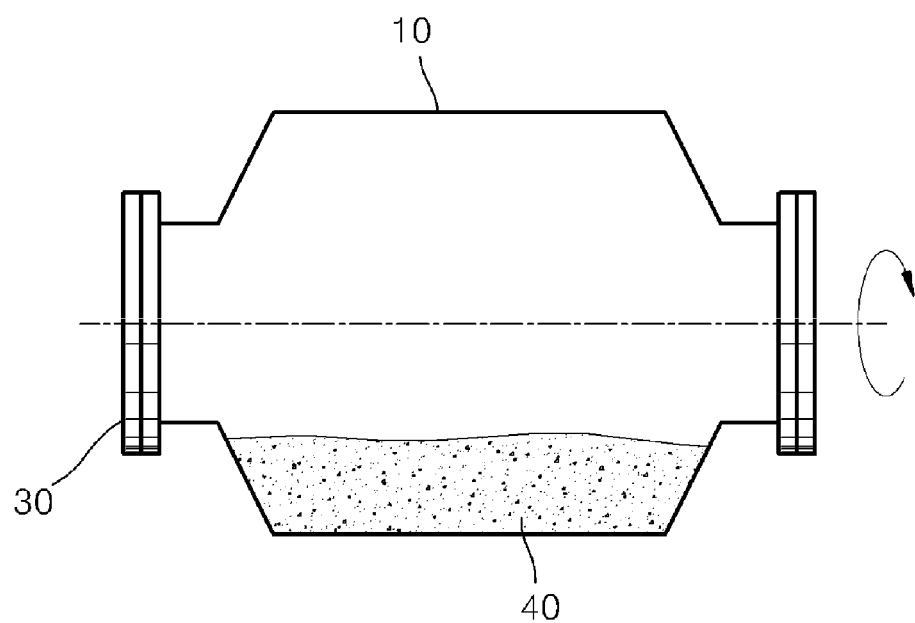

As described above, the first and second part furnace bodies 20a and 20b of the furnace body 20 are coupled to the outer circumference surface of the retort 10 to heat the retort 10. On the other hand, the first and second part furnace bodies 20a and 20b may be separated from each other and removed from the outer circumference surface of the retort 10 to cool the retort 10. FIG. 3 is a view of the retort 10 from which the furnace body 20 is removed.

A member 50 is further provided inside the retort 10. The member 50 allows the mixed powder 40 to rotate along an inner surface of the retort 10 when the retort 10 is rotated.

When the apparatus 100 is used, the mixed powder 40 loaded into the retort 10 is heated to induce a reaction between materials of the mixed powder 40 to obtain a compound powder to be wanted.

For example, iron-boron compound powder may be manufactured by using the apparatus 100. When the mixed powder 40 includes iron powder and a boron source material, the iron powder and the boron source material react each other in the retort 10, thereby boronizing the iron powder to transform the iron powder into an iron-boron compound powder. The iron-boron compound may be FeB, $Fe_2B$, or a mixture thereof.

The boron source material may be a material for supplying boron that reacts with iron powder, and may be provided as powder. Accordingly, the iron powder and the boron source material powder are mixed with each other and then, the mixed powder is loaded into the retort 10 of the apparatus 100. According to another embodiment of the present invention, the iron powder and the boron source material powder may be separately loaded into the retort 10 without mixing.

The iron powder may be a iron having relatively low other alloy elements including carbon, that is pure iron. When iron has other alloy elements, a diffusion rate of boron is low and thus, the formation of an iron-boron compound is suppressed to make it difficult to uniformly form a compound from the surface to the center of powder particles. The iron powder may be prepared by decarbonizing shot ball wasted after use as carbon steel.

The boron source material may include, for example, at least one of boron powder, boron compound powder, and ferro boron powder. The boron compound may include, for example, boron carbide ($B_4C$) or boron oxide ($B_2O_3$).

An average diameter of the boron source material powder particles may be smaller than an average diameter of the iron powder particles. This is to easily separate the iron-boron compound powder formed during boronizing from the remaining boron source material powder after boronizing. For example, a diameter of boron source material powder particles may be in a range of 5 μm to 950 μm, and a diameter of iron powder particles may be in a range of 10 μm to 1000 μm.

When the diameter of iron powder particles exceeds 1000 μm, it is difficult to uniformly form a compound from the surface to the center of the iron powder. When the diameter of iron powder particles is less than 10 μm, it is difficult to separate the iron-boron compound powder formed during boronizing from the remaining boron source material powder.

An active agent may be further added to the mixed powder 40 including the iron powder and the boron source material in the retort 10 to react the iron powder with the boron source material. The active agent may decrease a reaction temperature of the iron powder and the boron source material to further activate the reaction between iron and boron. The active agent may include at least one of $Na_3AlF_6$, $KBF_4$, $AlF_3$, NaCl, NaF, $CaF_2$, and $NH_4Cl$.

When the iron powder, the boron source material having a powder form and the active agent are mixed to form a mixture, an amount of the boron source material may be in a range of 5 to 50 weight % in the mixture and an amount of the active agent may be in a range of 0.5 to 10 weight % in the mixture.

Then, the retort 10 is rotated and heated by using the heating unit 22 of the furnace body 20.

When the furnace body 20 is not coupled to the outer circumference surface of the retort 10, first, the furnace body 20 is moved and then coupled to the outer circumference surface of the retort 10, and then, the first and second heating units 20a and 20b of the furnace body 20 are driven to heat the retort 10.

When the furnace body 20 includes the first part furnace body 20a and the second part furnace body 20b respectively disposed above and under the retort 10, as illustrated in FIG. 2, the first and second part furnace bodies 20a and 20b are moved to be coupled to the outer circumference surface of the retort 10.

Since the retort 10 is rotated during heating as illustrated in FIG. 1, the powder particles in the mixed powder 40 are uniformly mixed and the heat applied to by the heating unit 22 is uniformly delivered to the mixed powder 40.

As described above, when the retort 10 is heated, the iron powder reacts with boron source material powder in the mixed powder 40 loaded into the retort 10, thereby boronizing iron powder. The boron supplied from the boron source material may diffuse from the surface to inside of the iron powder according to the second diffusion law.

When the concentration of boron diffused into iron powder is low, a diffusion layer in which the boron is moved into the iron, thereby forming an iron-boron solid solution. However, when the concentration of boron increases, an iron-boron compound, such as FeB or $Fe_2B$, may be formed due to the reaction between iron and boron.

Figure 4:
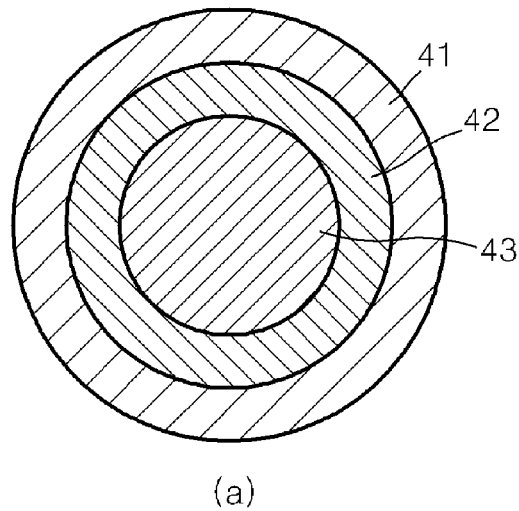
FIG. 4 is a cross-sectional view of the iron-boron compound powder particle manufactured by using the method of manufacturing compound powder, according to an embodiment of the present invention.
Figure 4:
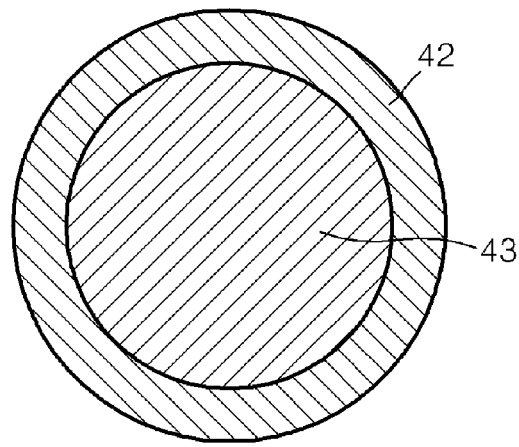
Figure 4:
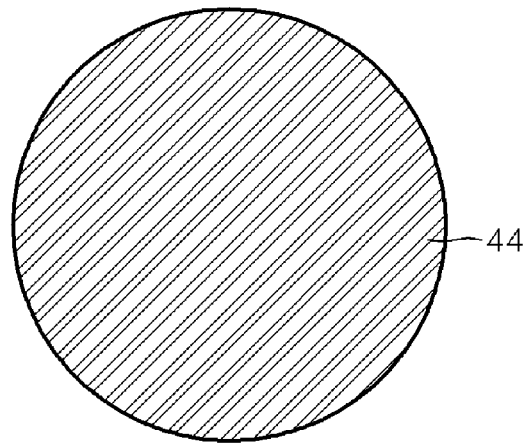

Accordingly, during boronizing, the iron powder may have different regions in an inward direction from the surface thereof according to the concentration of boron, as illustrated in FIG. 4. For example, the iron powder has three regions including a FeB layer 41, a $Fe_2B$ layer 42, and a iron-boron solid solution layer 43, as illustrated in FIG. 4A. For example, the iron powder has two regions including a $Fe_2B$ layer 42 and a boron-solid solution layer 43, as illustrated in FIG. 4B. For example, the iron powder has one region including a FeB or $Fe_2B$ compound 44, as illustrated in FIG. 4C.

A thickness x of the compound layer may be dependent upon a treatment temperature and time according to the following second diffusion law (Equation 1). Herein, "x" indicates the thickness of the compound layer, "t" indicates a process time, and "D" indicates a diffusion coefficient.

$$x=(Dt)^{1/2} \qquad \text{(Equation 1).}$$

As described above, when the iron powder has other alloy elements, the diffusion rate of boron decreases, the formation of FeB or $Fe_2B$ is suppressed, and it is difficult to uniformly form a compound from the surface to center of the powder. When the diameter of the iron powder particles is too large, it is difficult to uniformly change the entire iron powder into the compound. Accordingly, from this aspect, the iron powder particles may be pure iron powder having a diameter of at most 1000 μm.

The treatment temperature may be maintained at least at 850° C. for boronizing of iron. The treatment temperature may be maintained at lower than the lowest melting point of the iron-boron alloy, that is, 1177° C. to prevent the formation of a liquid iron-boron compound layer during boronizing. The treatment temperature may be, for example, 1050° C. or lower.

The treatment time may be in a range of 30 minutes to 600 minutes. When the treatment time is shorter than 30 minutes, the iron powder may not be sufficiently boronized. When the treatment time is longer than 600 minutes, the boronizing may reach beyond its saturation state, and thus, further boronizing may be unnecessary.

When boronizing of the iron powder inside the retort 10 is finished, the furnace body 20 is separated and removed from the outer circumference surface of the retort 10. Due to the removal of the furnace body 20, the heating unit 22 used to heat the retort 10 is removed, and accordingly, the retort 10 may begin to be naturally cooled. Since the retort 10 continues to rotate, powders in the retort 10 may be uniformly cooled.

After the retort 10 is sufficiently cooled, the powder mixture including the iron-boron compound powder is unloaded from the retort 10.

The powder mixture may include iron-boron compound powder formed by reacting the iron powder and the boron source material powder, and remaining source powder, and the active agent powder. Accordingly, a separation process may be performed to separate the powder mixture into iron-boron compound powder and the other powders. The separation process may be performed by using, for example, a sieve, to separate the iron-boron compound powder and the other powders from the powder mixture.

As another embodiment for manufacturing the iron-boron compound powder, boron supply gas may be used as a boron source material instead of a solid-phase powder. The boron supply gas is gas for supplying boron to react with iron powder, and may include boron gas or boron compound gas. The boron compound gas may include any one of $B_2H_6$, $BF_3$, $BCl_3$, $BI_3$, $BBr_3$, $(CH_3)_3B$, and $(C_2H_5)_3B$.

According to the present embodiment, iron powder is loaded as a source material 40 into the retort 10. Then, the retort 10 is heated by using the furnace body 20 to a predetermined temperature. While the temperature is maintained within a predetermined temperature range, for example, 850° C. to 1050° C., boron supply gas is supplied into the retort 10. The retort 10 may be rotated to allow the iron powder and the boron supply gas to uniformly react each other.

The boron supply gas may be supplied into the retort 10 through a gas pipe (not shown) extending from a gas storage (not shown) to the inside of the retort 10. The boron supply gas may be supplied in the form of a mixed gas prepared by mixing with carrier gas. An amount of the boron supply gas may be in a range of 2 volume % to 40 volume % based on the mixed gas.

When the reaction between the iron powder and the boron supply gas is completely performed in the retort 10, the supply of boron supply gas is stopped, and then, the furnace body 20 is separated from the retort 10 to cool the retort 10. To achieve uniform cooling, the retort 10 may rotate.

After the cooling is finished, the iron-boron compound powder generated by the reaction with iron powder is unloaded from the retort 10. According to the present embodiment, the boron source material is supplied in the form of gas, unlike the previous embodiments, the separation process for separating the iron-boron compound powder from other remaining powder may not be further performed.

Hereinafter, experimental examples are provided to help understanding of the present invention. However, the experimental examples are provided herein for illustration purpose only, and the present invention is not limited thereto.

Experimental Example 1

Iron powder having an average particle of 80# to 100# was mixed with boron carbide ($B_4C$) powder having an average particle of 120# or less, which was a boron source material, and $Na_3AlF_6$ powder, which was an active agent, to manufacture a mixed powder. An amount of the boron carbide powder was 10 weight %, and an amount of the $Na_3AlF_6$ powder was 1 weight % in the mixed powder.

The mixed powder was loaded into the retort 10 of the apparatus 100 of FIG. 1, and then, the retort 10 was heated at a temperature of 950° C. for 3 hours to boronize iron powder. During heating, the retort 10 was rotated at a rate of 50 rpm.

When the boronizing was finished, the furnace body 20 was separated from the outer circumference surface of the retort 10, and then, the retort 10 was cooled while rotating, as illustrated in FIG. 3. After the cooling was finished, the powder mixture was unloaded from the retort 10, and then, sieved to divide the powder mixture into the iron-boron compound powder obtained from the boronizing and the remaining boron carbide powder.

Figure 5:
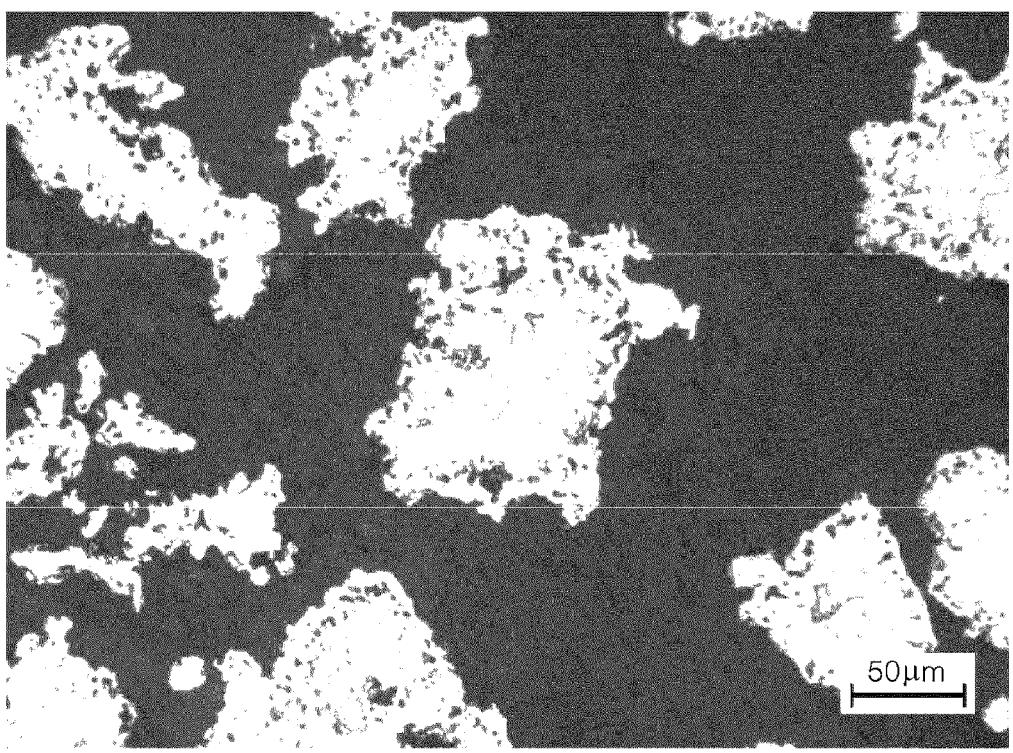
FIG. 5 a cross-sectional view of the iron-boron compound powder manufactured according to the experimental example, according to an embodiment of the present invention.
Figure 6:
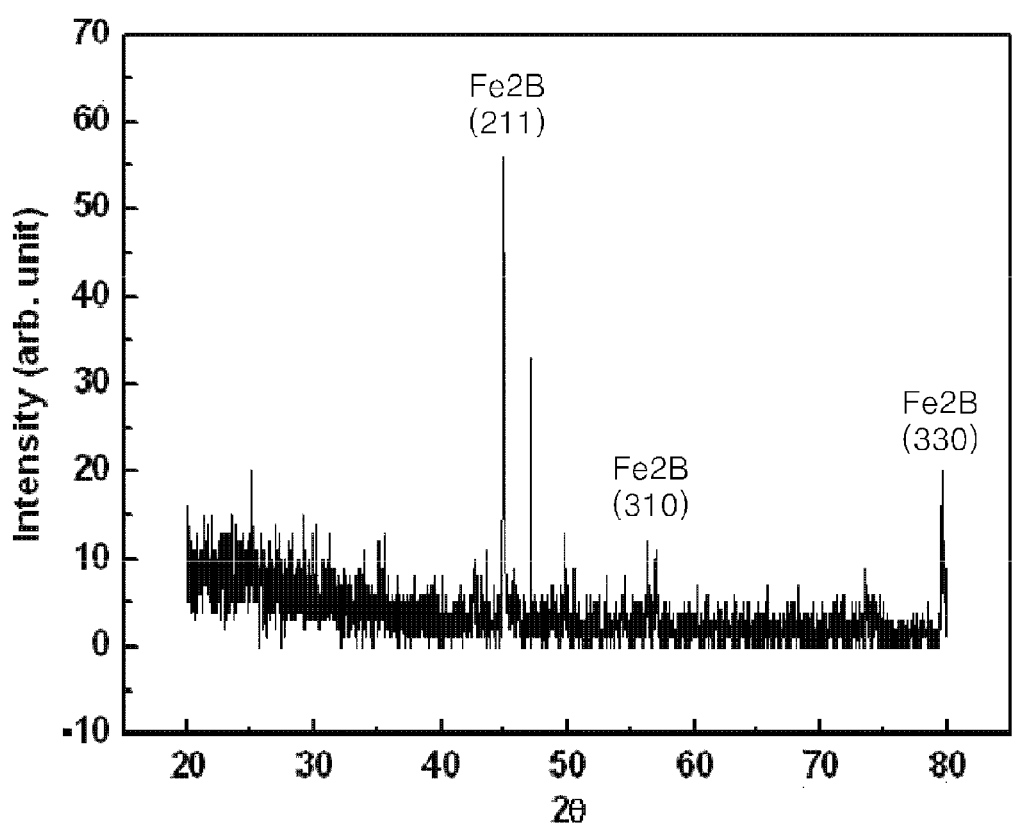
FIG. 6 show X-ray diffraction (XRD) analysis results of the iron-boron compound powder manufactured according to the experimental example, according to an embodiment of the present invention

FIG. 5 shows a cross-sectional view of the iron-boron compound powder manufactured according to the present experimental example. Referring to FIG. 5, it is confirmed that the powder is formed of an iron-boron compound. FIG. 6 shows X-ray diffraction results of the powder, and referring to FIG. 6, it is confirmed that the powder is formed of $Fe_2B$ as the iron-boron compound.

The hardness of the powder was measured by using a Vickers hardness tester (weight of 20 g). The obtained hardness value is as high as HV 1650.

Hereinafter, in connection with FIGS. 7 and 8, de-boronizing will be described according to according to another embodiment of the present invention.

Figure 7:
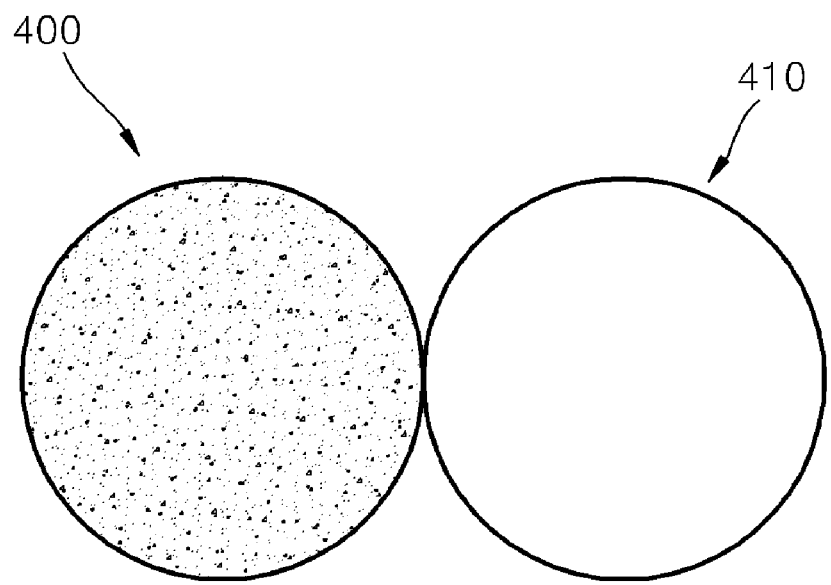
FIGS. 7 and 8 are views for explaining de-boronizing of the boron iron alloy powder and boronizing of the target powder, occurring in the powder mixture, according to an embodiment of the present invention.
Figure 8:
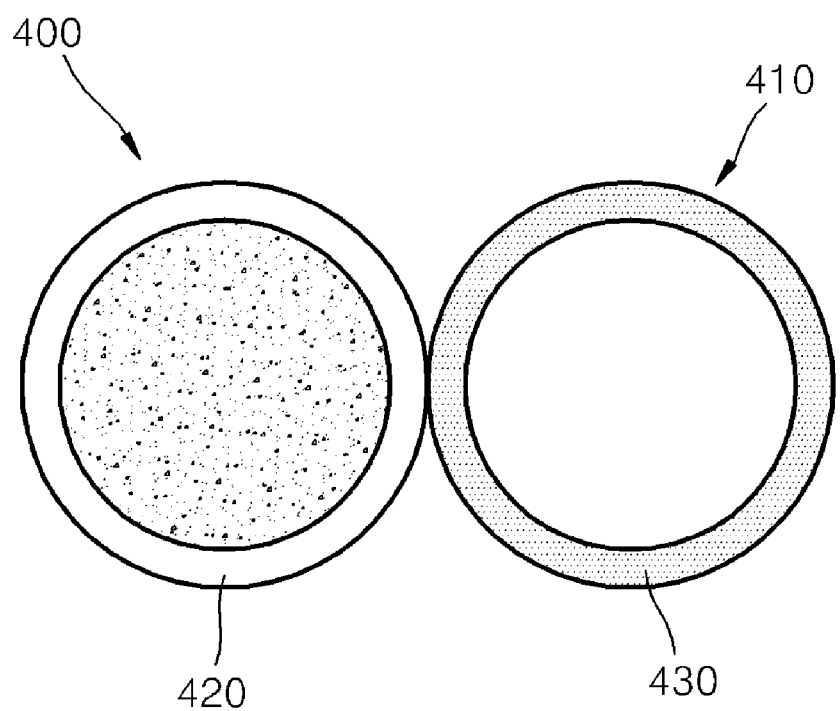

FIG. 7 shows a conceptual view illustrating a boron iron alloy powder 400 and a target powder 410 contacting each other in the mixed powder before de-boronizing.

The target powder 410 may be any one of various metallic elements that have affinity with boron and are combined with boron to form a boron compound. Such a metallic element may be, for example, at least one selected from the group consisting of iron (Fe), titanium (Ti), chromium (Cr), zirconium (Zr), hafnium (Hf), vanadium (V), tantalium (Ta), molybdenum (Mo), nickel (Ni), cobalt (Co), aluminum (Al), silicon (Si), and tungsten (W).

Referring to FIG. 7, when the mixed powder in which the boron iron alloy powder 400 contacts the target powder 410 is heated to a predetermined temperature, the boron may diffuse from the boron iron alloy powder 400 to the target powder 410, thereby boronizing the target powder 410 due to a chemical reaction. Accordingly, the boron iron alloy powder 400 is de-boronized to reduce the boron content therein, but the boron content in the target powder 410 may increase due to the supply of boron.

The de-boronizing of the boron iron alloy powder 400 may begin from the surface of the boron iron alloy powder 400, and the increase in the boron content of the target powder 410 may also begin from the surface of the target powder 410. FIG. 8 exemplarily illustrates a de-boronized region 420 of the boron iron alloy powder 400 and a boronized region 430 of the target powder 410, which are formed during de-boronizing. The de-boronized region 420 is a region of the boron iron alloy powder 400 in which the boron content is reduced due to the de-boronizing, and the boronized region 430 is a region of the target powder 410 in which the boron content is increased due to the supply of boron.

During de-boronizing, the de-boronized region 420 formed on the surface of the boron iron alloy powder 400 due to the de-boronizing may have a lower melting point than before the boron content is reduced. This will be explained by referring to the iron (Fe)-boron (B) phase diagram of FIG. 10.

Figure 10:
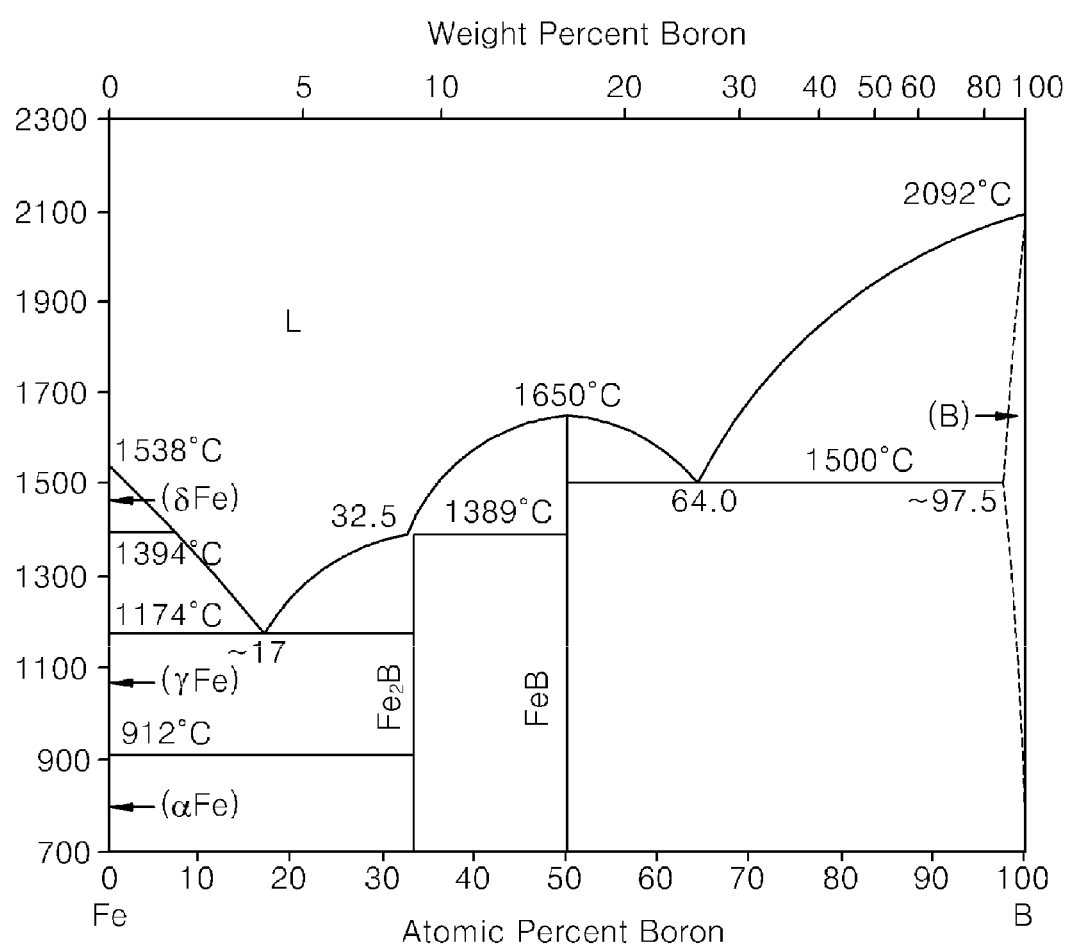
FIG. 10 is a phase view of iron and boron, according to an embodiment of the present invention.

Referring to the iron-boron phase diagram of FIG. 10, the melting point of iron is 1538° C. and the melting point of boron is 2092° C. When 64 atomic % of boron is added to iron, the peritectic transformation may occur at a temperature of 1500° C. When 17 atomic % of boron is added, the eutectic transformation may occur at a relatively low temperature of 1174° C. Accordingly, when the boron content in the boron iron alloy is reduced from 50 atomic % to 17 atomic %, the melting point of the boron iron alloy may reduce from 1650° C. to 1174° C.

For example, when the initial boron content of the boron iron alloy powder 400 is 50 atomic % and thereafter during de-boronizing, the de-boronized region 420 having the boron content of 17 atomic % is formed due to the de-boronizing on the surface of the boron iron alloy powder 400, the formation of the de-boronized region 420 may lead to a decrease in the melting point of the surface of the boron iron alloy powder 400 from 1650° C. to 1174° C. That is, the temperature of the melting point decreases by about 480° C.

As described above, the boron iron alloy powder 400 is a boron source material for boronizing the target powder 410, and also, the melting point thereof is substantially reduced due to the de-boronizing caused by the supply of boron.

The boron content of the boron iron alloy powder in the powder mixture before de-boronizing may be 17 atomic % or more, and for example, may be in a range of 17 atomic % to 80 atomic %. In addition, after the de-boronizing, the boron content of the boron iron alloy powder in the powder mixture may be in a range of 5 to 35 atomic %, and furthermore, in a range of 10 to 25 atomic %.

In addition, the boron iron alloy powder 400 may further include at least one of silicon (Si) or carbon (C), and in this case, due to de-boronizing, the melting point of the boron iron alloy powder 400 may be further reduced to lower than 1174° C. The content of Si may be 5 weight % or less, and the content of C may be 2 weight % or less.

In addition, the boronized region 430 formed on the surface of the target powder 410 may be either a region in which the metal in the target powder 410 forms a solid solution with boron, or a boron compound layer that is formed by the reaction between boron and the metal in the target powder 410. For example, before the de-boronizing, the target powder 410 in the mixed powder may be iron (Fe), titanium (Ti), chromium (Cr), zirconium (Zr), hafnium (Hf), vanadium (V), tantalum (Ta), molybdenum (Mo), nickel (Ni), cobalt (Co), aluminum (Al), silicon (Si), and tungsten (W), and boron compounds thereof may be FeB, $TiB_2$, $CrB_2$, $ZrB_2$, $HfB_2$, $VB_2$, $AlB_{12}$, $SiB_6$, NiB, CoB, $TaB_2$, $Mo_2B_5$, or $W_2B_5$. These boron compounds may have as a high hardness value as HK2000 or more.

For example, in the case of the target powder 410 is an iron (Fe) powder, when the concentration of boron diffusing into the iron powder is low, a diffusion layer in which the iron forms a solid solution with boron in the boronized region 430, and when the concentration of boron increases, FeB or $Fe_2B$ may be formed as an iron-boron compound due to the reaction between iron and boron.

Figure 9:
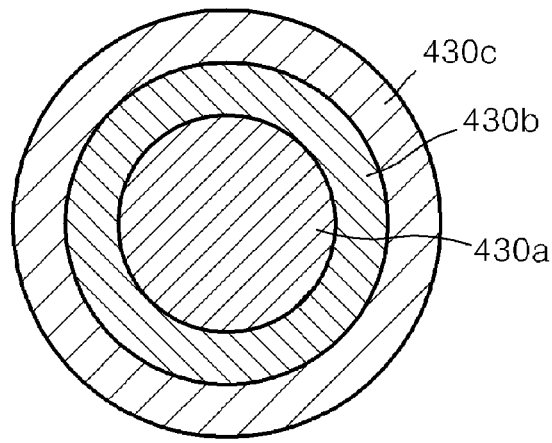
FIG. 9 is an exemplary view of a structure formed by boronizing of the target powder, according to an embodiment of the present invention.
Figure 9:
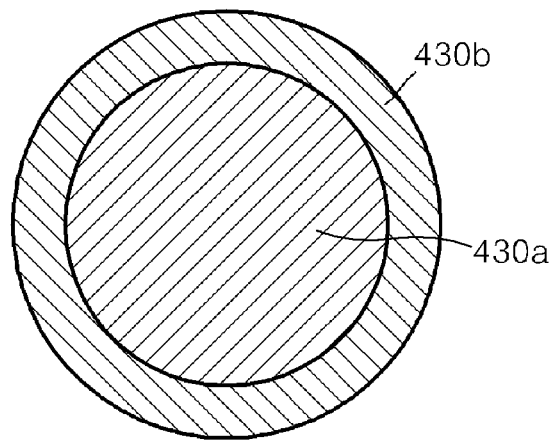
Figure 9:
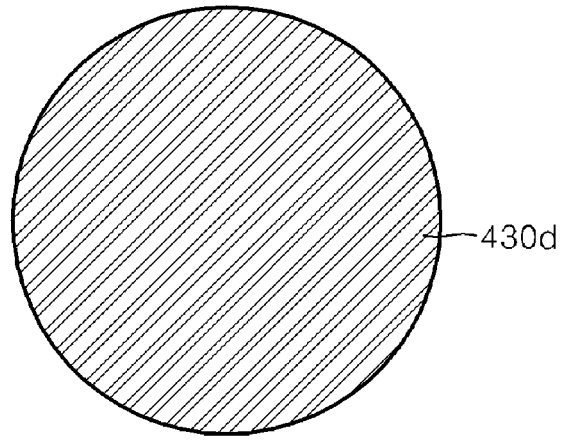

For example, the iron powder may turn into, as illustrated in FIG. 9, during boronizing, inwardly from the surface thereof, according to the concentration of boron, FeB—$Fe_2B$-boron solid solution layers 430c, 430b, and 430a (FIG. 9A), or $Fe_2B$-boron solid solution layers 430b and 430a (FIG. 9B), or a compound layer 430d (FIG. 9C).

The thickness x of the compound layer may be dependent upon a treatment temperature and time according to the following second diffusion law (Equation 2). Herein, x indicates the thickness of the compound layer, t indicates a process time, and D indicates a diffusion coefficient.

$$x=(Dt)^{1/2} \quad \text{(Equation 2)}$$

For example, in the case in which the target powder is iron powder, when the iron powder has other alloy elements, the diffusion rate of boron decreases, the formation of FeB or $Fe_2B$ is suppressed, and it is difficult to uniformly form a compound from the surface to center of the powder. When the diameter of the iron powder particles is too large, it is difficult to uniformly change the entire iron powder into the compound. Accordingly, from this aspect, the iron powder particles may be pure iron powder having a diameter of at most 1000 μm. Other target powders described above than iron powder may have a diameter of at most 1000 μm due to the same ground, and may be used in a pure state thereof. However, the present invention is not limited thereto, and in consideration of purpose, costs, and other effects, alloy powder to which other elements are added may be used as a target powder.

In addition, the melting point of the boronized region 430 of the target powder 410 may be lower than before the boronizing. For example, referring to FIG. 10, when the target powder is pure iron powder, the target powder is boronized by the boron iron alloy powder, the boron content thereof increases from 0 to 17 atomic %, and thus, the melting point of the target powder decreases from 1538° C. to a process temperature of 1174° C. of the eutectic temperature. In addition, when the boronized region has $Fe_2B$ as a boron compound, the melting point of the target powder is 1389° C., which is lower than the melting point of pure iron of 1538° C.

Accordingly, in this case, the boron iron alloy powder that is included in as a boron source material and the target powder that is to be subjected to boronizing, which are included in the powder mixture before de-boronizing, both have a lower melting point than before the de-boronizing.

Accordingly, in the powder mixture that has been subjected to the de-boronizing, at least a portion of the boron iron alloy powder has a de-boronized region having a relatively low boron content due to de-boronizing and at least a portion of the target powder has a boronized region. Thus, the powder mixture that has been subjected to de-boronizing is named as a boron alloy powder mixture.

The de-boronized region having a relatively lower boron content has a relatively low melting point compared to a region that is not de-boronized to have a relatively high boron content.

The de-boronizing degree of the boron iron alloy powder or the boronizing degree of the target powder may depend on conditions of the de-boronizing or sizes of the boron iron alloy powder and the target powder. That is, when the de-boronizing is performed for a sufficiently long period of time at high temperature, or the sizes of the boron iron alloy powder and the target powder are small, the boron iron alloy powder may be completely de-boronized or the target powder may be completely boronized.

For example, when FeB as a boron iron alloy powder, is mixed with Cr powder and then de-boronizing is performed, a portion of the boron iron alloy powder may be de-boronized into $Fe_2B$ or the boron iron alloy powder may be completely de-boronized into $Fe_2B$ due to the de-boronizing. Similarly, the Cr powder may be partially or completely boronized into CrB due to the boronizing.

The de-boronized boron iron alloy powder in the powder mixture may be directly used as a binding agent for binding the boronized target powder 410. That is, since the boronized target powder is mixed with the boron iron alloy powder having a lower melting point due to the de-boronizing in the powder mixture, the powder mixture may be directly used for the preparation of combined powder structure without separation of the boronized target powder.

For example, when the powder mixture subjected to the de-boronizing is heated to a temperature higher than the melting point of the boron iron alloy powder that is reduced due to the decrease in the boron content, at least a portion of the boron iron alloy powder may be melted to form a liquid phase and the liquid phase may surround the boronized target powder particles, thereby combining them. In this case, the liquid phase formed by melting at least a portion of the boron iron alloy powder surrounds the boronized target powder particles, thereby combining them.

As described above, due to the decrease in the boron content of the boron iron alloy powder during de-boronizing, the melting point of the boron iron alloy powder may be decreased to 1174° C., and then the heating temperature may be much lower than the portion of the boron iron alloy powder that is not de-boronized. When the liquid phase of the molten boron iron alloy powder contacts and surrounds the target powder, and then, the liquid phase is solidified, a combined powder structure is formed in which the target powder and the boron iron alloy powder are combined with each other.

The boronized region of the target powder may also be melted due to the lower meting point thereof. In this case, the de-boronized region of the boron iron alloy powder and the boronized region of the target powder are melted together and fused to each other, thereby increasing a binding force between the powders.

In some embodiments, while the de-boronized region of the boron iron alloy powder contacts the boronized region of the target powder, the de-boronized region and the boronized region are combined with each other by sintering.

Accordingly, in the combined powder structure manufactured as described above, at least one portion of the boron iron alloy powder having a de-boronized region or at least a portion of the target powder having a boronized region is melted and solidified to combine the de-boronized region with the boronized region, or the de-boronized region and the boronized region may be sintered to form a combined structure.

The de-boronized region of the boron iron alloy powder that forms the combined powder structure may be disposed on the surface of the boron iron alloy powder. The boron iron alloy powder may further include at least one of Si and C, and in this case, the melting point of the boron iron alloy powder may be further decreased in forming the combined powder structure.

In addition, the boronized region 430 forming the combined powder structure formed on the surface of the target powder 410 may be either a boron solid solution that is a region of the target powder 410 in which the metal in the target powder 410 forms the solid solution with boron, or a boron compound layer that is formed by the reaction between boron and the metal in the target powder 410. For example, before the de-boronizing, the target powder 410 in the mixed powder may be at least one of iron (Fe), titanium (Ti), chromium (Cr), zirconium (Zr), hafnium (Hf), vanadium (V), tantalum (Ta), molybdenum (Mo), nickel (Ni), cobalt (Co), aluminum (Al), silicon (Si), and tungsten (W), and boron compounds thereof may be FeB, $TiB_2$, $CrB_2$, $ZrB_2$, $HfB_2$, $VB_2$, $AlB_{12}$, $SiB_6$, NiB, CoB, $TaB_2$, $Mo_2B_5$, or $W_2B_5$. These boron compounds may have as a high hardness value as HK2000 or more.

According to another embodiment of the present invention, other powder may be added to the powder mixture subjected to the de-boronizing to combine the other powder with at least one of the de-boronized boron iron alloy powder and the boronized target powder, thereby forming a combined powder structure.

The other powder may include pure metal powder, alloy powder, or ceramic powder. For example, the pure metal powder may be at least one selected from iron (Fe), titanium (Ti), chromium (Cr), zirconium (Zr), hafnium (Hf), vanadium (V), tantalum (Ta), molybdenum (Mo), nickel (Ni), cobalt (Co), aluminum (Al), silicon (Si), and tungsten (W).

The alloy powder of the other powder may include a self-fluxing alloy powder. The self-fluxing alloy may be an alloy that is self-deoxidized or form slag during melting, and representative examples thereof may be a boron-containing nickel-based, silicon-containing nickel-based, cobalt-based, or iron-based alloy. When the self-fluxing alloy powder is added, the wearing resistance, the oxidation resistance, the corrosion resistance properties may improve.

In addition, the ceramic powder of the other powder may include at least one of a metal oxide, a metal carbide, a metal nitride, or a metal boride. For example, the ceramic powder may be a nitride, carbide, boride, or oxide of each of iron (Fe), titanium (Ti), chromium (Cr), zirconium (Zr), hafnium (Hf), vanadium (V), tantalum (Ta), molybdenum (Mo), nickel (Ni), cobalt (Co), aluminum (Al), silicon (Si), and tungsten (W). When the combined powder structure is manufactured by adding high-hardness ceramic powder, the mechanical property, such as hardness or strength, of the combined powder structure may be further enhanced.

The target powder of the powder mixture may act as high-hardness boride powder or, as described above. The target powder of the powder mixture may be melted with the boron iron alloy powder to allow the other powder to combine with the boron iron alloy powder or the target powder. Accordingly, the other powder may also be combined with at least one of the de-boronized boron iron alloy powder and the boronized target powder.

In some embodiments, a flux may be further added to the powder mixture to manufacture a combined powder structure. An example of the flux is borax ($Na_2B_4O_7 \cdot 10H_2O$).

The de-boronizing of the powder mixture may be understood by referring to FIGS. 1 to 3.

Hereinafter, the de-boronizing of powder mixture is described in connection with FIGS. 1 to 3.

Referring to FIGS. 1 to 3, when the reactor described above and the apparatus 100 are used, the mixed powder 40 loaded into the retort 10 is heated to perform de-boronizing of the boron iron alloy powder of the mixed powder 40 and boronizing of the target powder of the mixed powder 40. In addition, an active powder may be additionally loaded into the retort 10 in addition to the boron iron alloy powder and the target powder of the mixed powder 40. The active agent may decrease a reaction temperature of the boron iron alloy powder and the target powder to promote a thermo-chemical precipitation The active agent may be provided in the form of powder and may include at least one of $Na_3AlF_6$, $KBF_4$, $AlF_3$, NaCl, NaF, $CaF_2$, and $NH_4Cl$. The active agent may be included in an amount of 0.5 to 20 weight % based on the mixed powder 40.

In addition, the active agent may be supplied in the form of gas, and may include at least one of HCl gas and $CCl_4$ gas. The active agent gas may be supplied into the retort 10 through a gas pipe (not shown) extending from an active agent gas storage (not shown) to the inside of the retort 10.

Referring to FIG. 1, first, the mixed powder 40 of the boron iron alloy powder and the target powder is loaded into the retort 10. The boron iron alloy powder and the target powder may be separately loaded and then mixed, or the boron iron alloy powder and the target powder may be mixed in advance to form a mixed powder and then, the mixed powder is loaded into the retort 10. An amount of the boron iron alloy powder may be in a range of 5 to 95 weight %, for example, 10 to 90 weight %, based on the mixed powder 40. In addition, as described above, the active agent powder may be added to the mixed powder 40.

Then, the retort 10 is rotated and heated by using the heating unit 22 of the furnace body 20. When the furnace body 20 is not coupled to the outer circumference surface of the retort 10, first, the furnace body 20 is moved and then coupled to the outer circumference surface of the retort 10, and then, the first and second heating units 20a and 20b of the furnace body 20 are driven to heat the retort 10.

When the furnace body 20 includes the first part furnace body 20a and the second part furnace body 20b respectively disposed above and under the retort 10, as illustrated in FIG. 3, the first and second part furnace bodies 20a and 20b are moved to be coupled to the outer circumference surface of the retort 10.

Since the retort 10 is rotated during heating as illustrated in FIG. 1, the powder particles in the mixed powder 40 are uniformly mixed and the heat applied to by the heating unit 22 is uniformly delivered to the mixed powder 40. When the retort 10 is heated, the target powder is boronized by using the boron iron alloy powder loaded in the retort 10.

The de-boronizing may be performed in an anti-oxidation atmosphere. To this end, an inert gas, such as nitrogen gas or argon gas, may be introduced into the retort 10, or a reducing gas, such as hydrogen gas, may be introduced to form an anti-oxidation atmosphere. According to another embodiment of the present invention, a vacuum pump is used to make the inside of the retort 10 to be evacuated to form the anti-oxidation atmosphere.

To prevent the formation of the liquid phase during de-boronizing, a de-boronizing temperature may be maintained at a temperature lower than the melting point of the boron iron alloy powder or target powder. For example, when the target powder is iron powder, in consideration of the decrease in the melting point of the boron iron alloy powder due to de-boronizing during de-boronizing, the de-boronizing temperature may be maintained at less than 1177° C. that is the lowest melting point of an iron-boron alloy. The de-boronizing temperature may be, for example, at 1050° C. or lower.

The treatment time may be in a range of 30 to 600 minutes. When the treatment time is shorter than 30 minutes, the target powder may not be sufficiently boronized. When the treatment time is longer than 600 minutes, the boronizing may reach beyond its saturation state, and thus, further boronizing may be unnecessary.

Then, the furnace body 20 is removed from the outer circumference surface of the retort 10. Due to the removal of the furnace body 20, the heating unit 22 used to heat the retort 10 is removed, and accordingly, the retort 10 may begin to be naturally cooled.

Since the retort 10 continues to rotate, the mixed powder 40 in the retort 10 may be uniformly cooled. To achieve the uniform cooling, the retort 10 may be rotated during cooling. After the retort 10 is sufficiently cooled, the mixed powder 40 which are completely boronized and de-boronized is unloaded from the retort 10. Once the de-boronizing is completely performed, a boron alloy powder mixture, in which ferro-boron including the de-boronized region is mixed with the target powder including the boronized region, is formed from the mixed powder 40.

The boron alloy powder mixture is used as a source material for the preparation of the combined powder structure. That is, the mixed powder 40 has a very high hardness, and excellent high-temperature oxidation and corrosion-resistance property, and may be used in forming coating layers of various mechanical parts requiring such property. In addition, due to the relative decrease in the melting point due to the de-boronizing and the boronizing, a heating temperature for manufacturing the combined powder structure may be decreased, or fusing property of powders may improve to produce a combined powder structure having a stronger binding force.

For example, the boron alloy powder mixture may be sintered or molten-solidified to produce a combined powder structure that is suitable for use in mechanical parts. Before the heating, the powder mixture is provided to a mold having a predetermined shape and then heated to manufacture the combined powder structure. In some embodiments, the powder mixture supplied to a mold may be further compressed by using a press to manufacture a molded product. The molded product is heated to manufacture a combined powder structure having a predetermined shape.

Hereinafter, experimental examples are provided to help understanding of the present invention. However, the experimental examples are provided herein for illustration purpose only, and the present invention is not limited thereto.

Experimental Example 2

78 weight % of the boron iron alloy powder particles having a size of 30 mesh to 100 mesh, 20 weight % of Cr powder having a size of 10 mesh, and 1 weight % of each of $KBF_4$ and $AlF_3$ acting as an active agent were loaded into a retort, and then, the mixture was heated while rotation, and then, maintained at a temperature of 950° C. for 3 hours to perform de-boronizing of the boron iron alloy powder and boronizing of Cr powder, followed by cooling.

Figure 11:
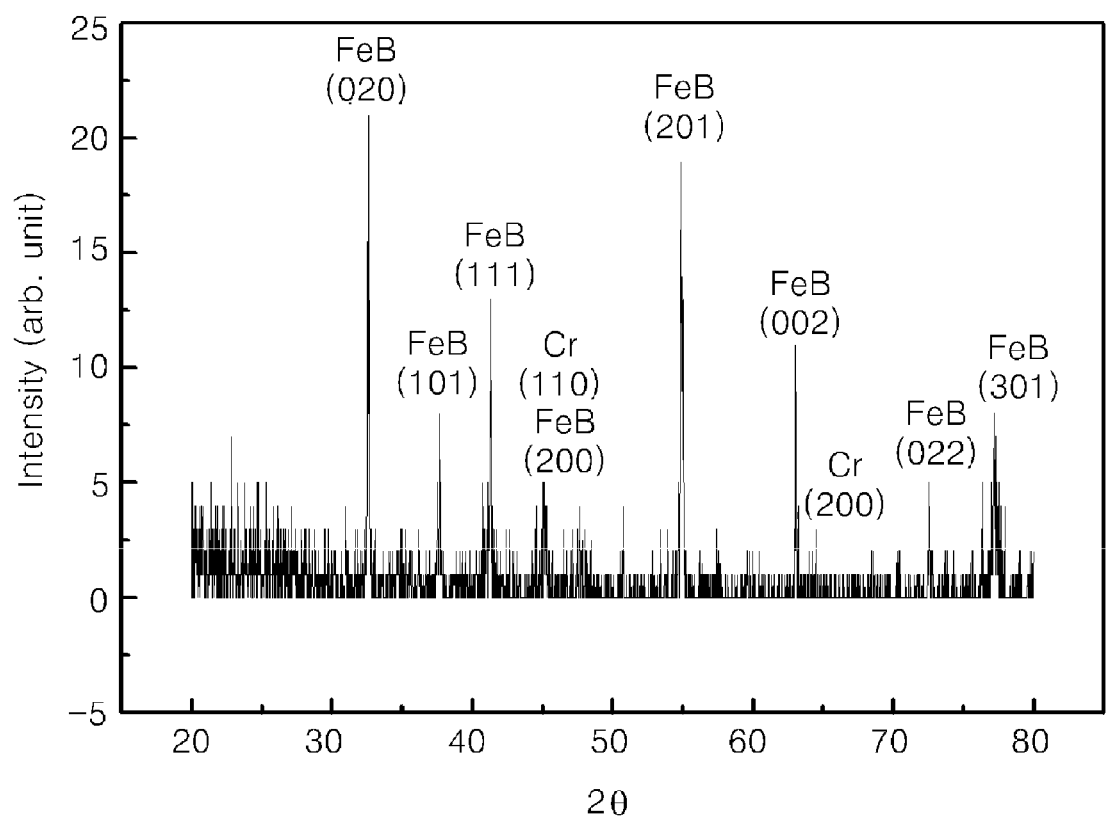
FIG. 11 shows XRD diffraction results of the boron iron alloy powder and the chromium (Cr) powder in the powder mixture before de-boronizing, according to an embodiment of the present invention.
Figure 12:
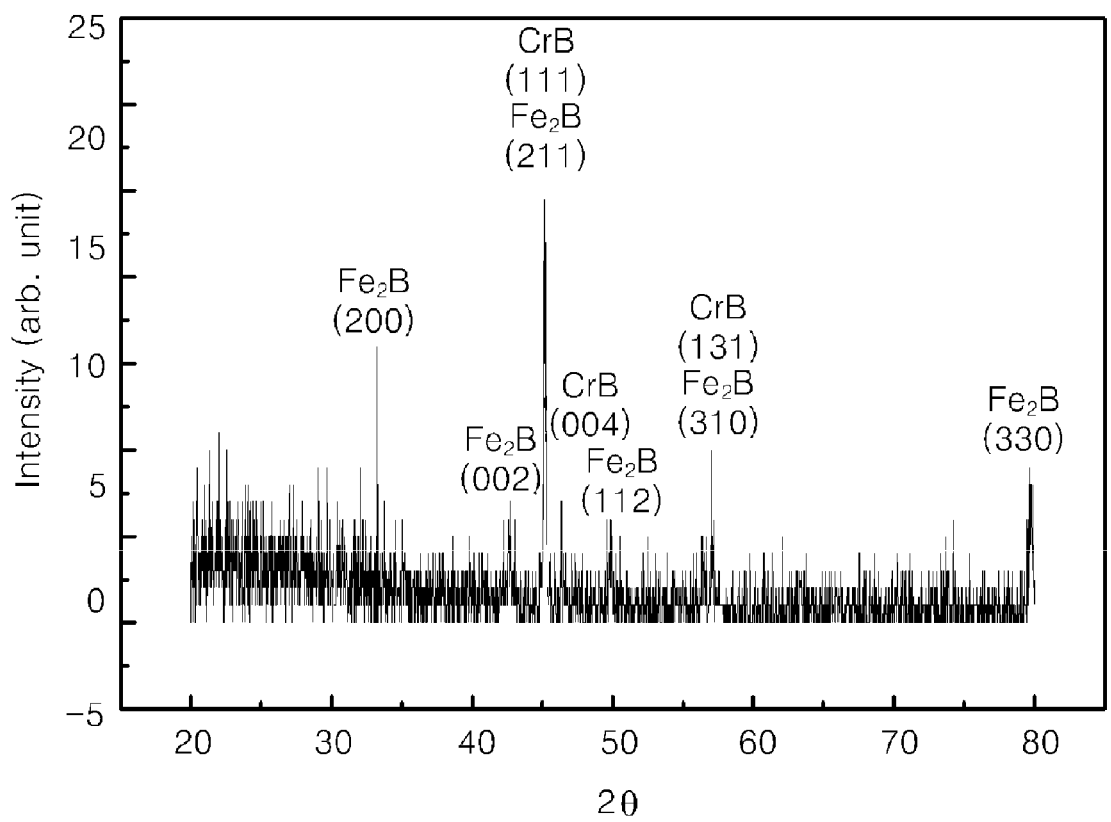
FIG. 12 shows XRD diffraction results of the boron iron alloy powder and the chromium (Cr) powder in the powder mixture after de-boronizing, according to an embodiment of the present invention.

FIGS. 11 and 12 respectively show X-ray diffraction results before and after the de-boronizing and boronizing of the powder mixture. Referring to FIGS. 11 and 12, before the de-boronizing and the boronizing, the powder mixture includes FeB and Cr, and after the de-boronizing and the boronizing, FeB powder is de-boronized and Cr powder is boronized, thereby producing $Fe_2B$ and CrB each having a relatively low melting point.

Figure 13:
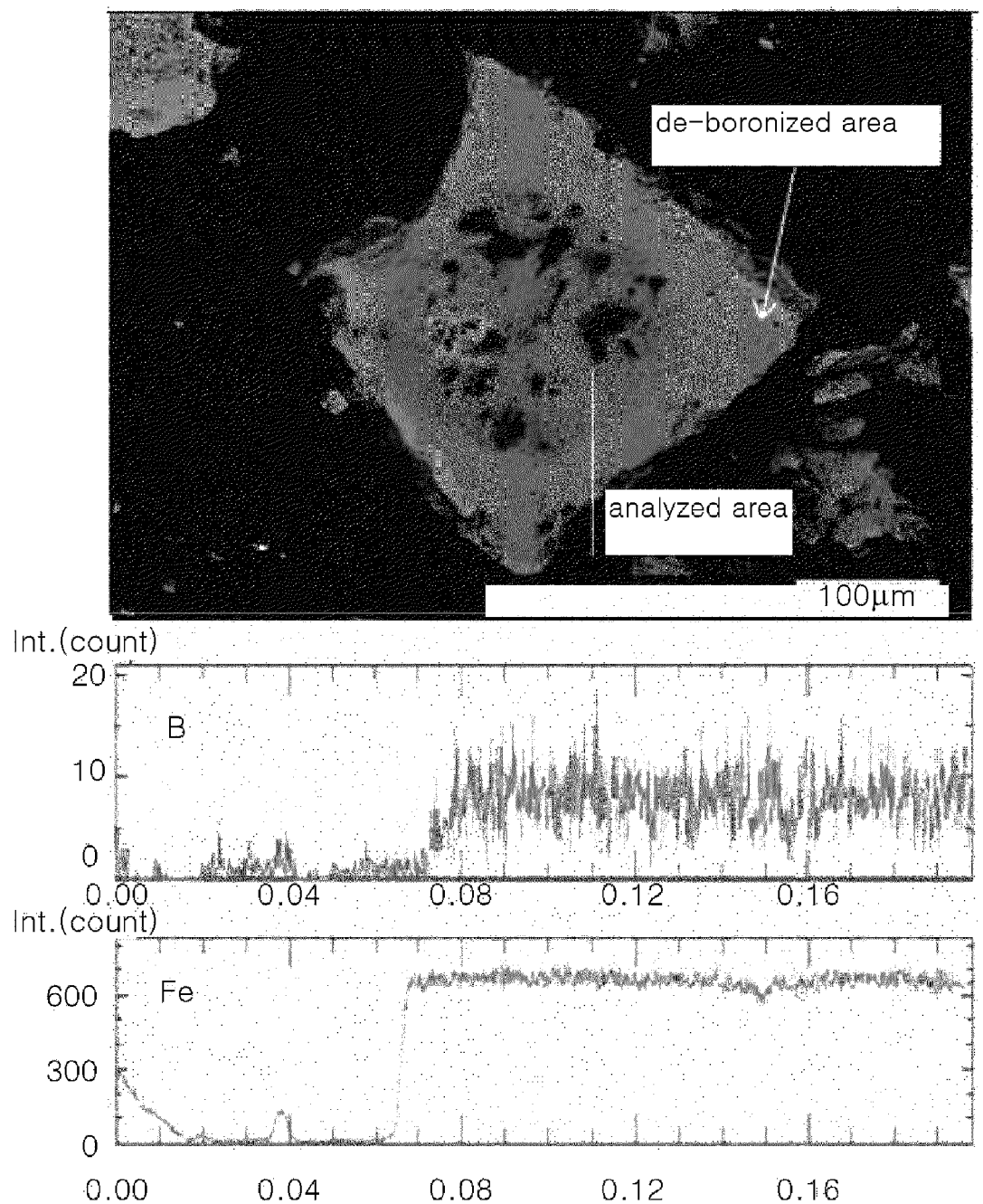
FIGS. 13 and 14 are a cross-sectional view of the boron iron alloy powder and the chromium (Cr) powder in the powder mixture after de-boronizing and show EPMA analysis results of the boron iron alloy powder and the chromium powder in the powder mixture after de-boronizing respectively, according to an embodiment of the present invention.

FIG. 13 shows the cross-section of the de-boronized boron iron alloy powder and EPMA analysis results of the composition thereof. Referring to FIG. 13, it was confirmed that a de-boronized region (that is, the de-boronizing layer of FIG. 13) having a reduced boron content due to the de-boronizing was formed on the surface of the boron iron alloy powder.

Figure 14:
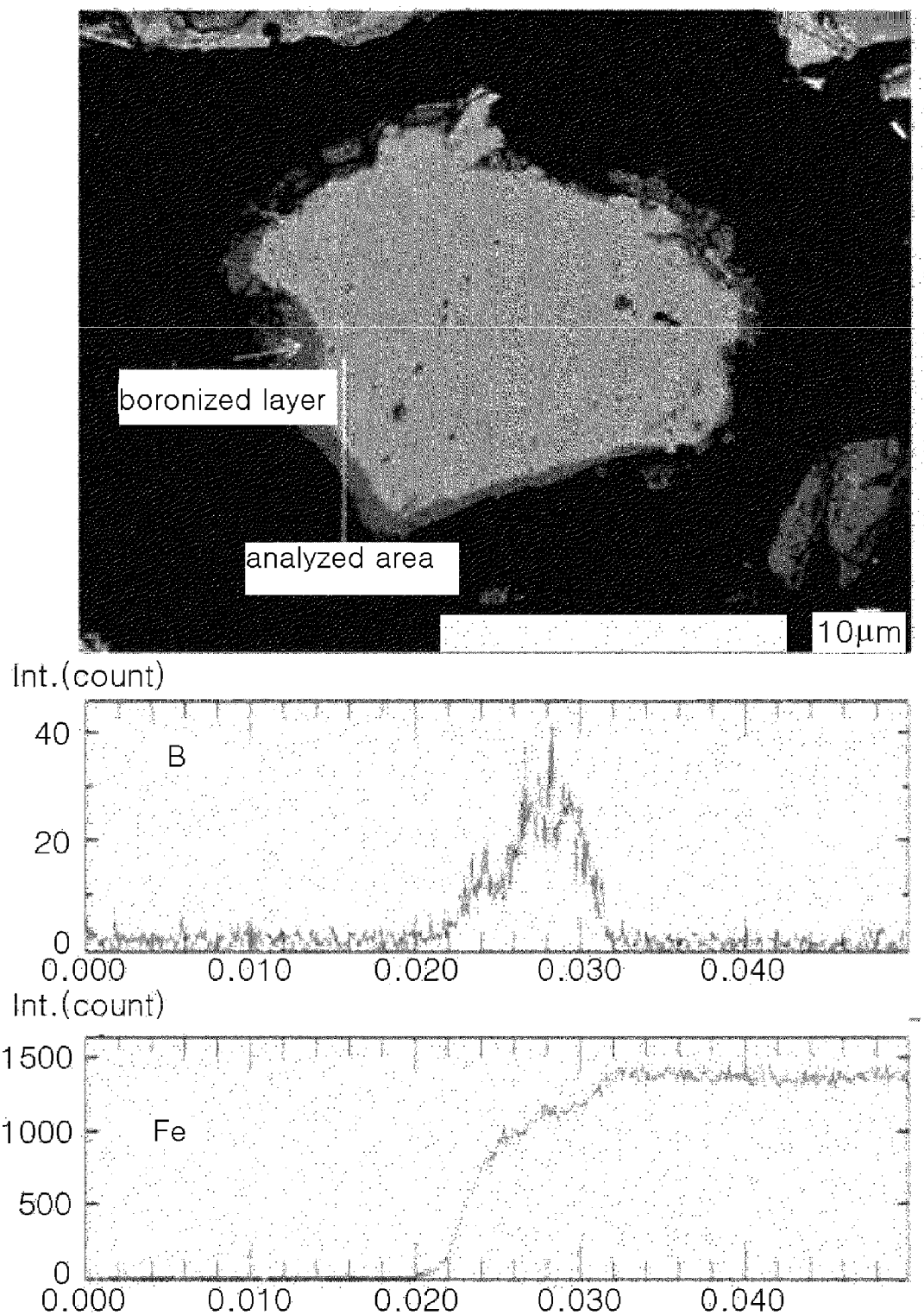

FIG. 14 shows the cross-section of boronized Cr powder and EPMA results thereof, and referring to this drawing, it was confirmed that a boronized region (that is, the boronized layer of FIG. 14) having an increased boron content due to boronizing was formed on the surface of the Cr powder.

Experimental Example 3

Figure 15:
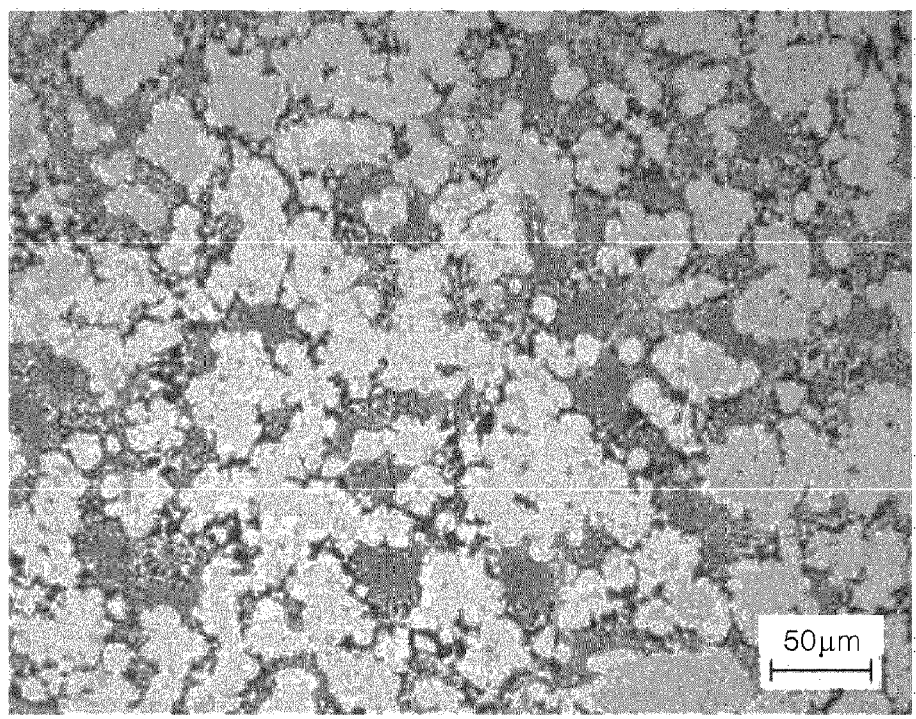
FIG. 15 shows the microstructure of the combined powder structure manufactured according to the experimental example, according to an embodiment of the present invention.

90 weight % of waste shot ball formed of carbon steel and 10 weight % of the boron iron alloy powder were mixed, and then, the mixture was heated to de-boronize the ferro-boron and boronize the waste shot ball, thereby manufacturing a powder mixture. 10 weight % borax ($Na_2B_4O_7 10H_2O$) acting as a flux, was added to 90 weight % of the powder mixture and then, the result was loaded into a mold formed of a carbonaceous material, followed by heating at a temperature of 1250° C. for 10 minutes to manufacture combined powder structure. FIG. 15 shows the micro structure of the combined powder structure. Referring to FIG. 15, the micro structure includes an iron-boron compound (the white region of FIG. 15) and a process solidified structure (the black region of FIG. 15). The combined powder structure was measured by using the Rockwell hardness tester, and the result thereof was a hardness value of HRA 78.

Experimental Example 4

Figure 16:
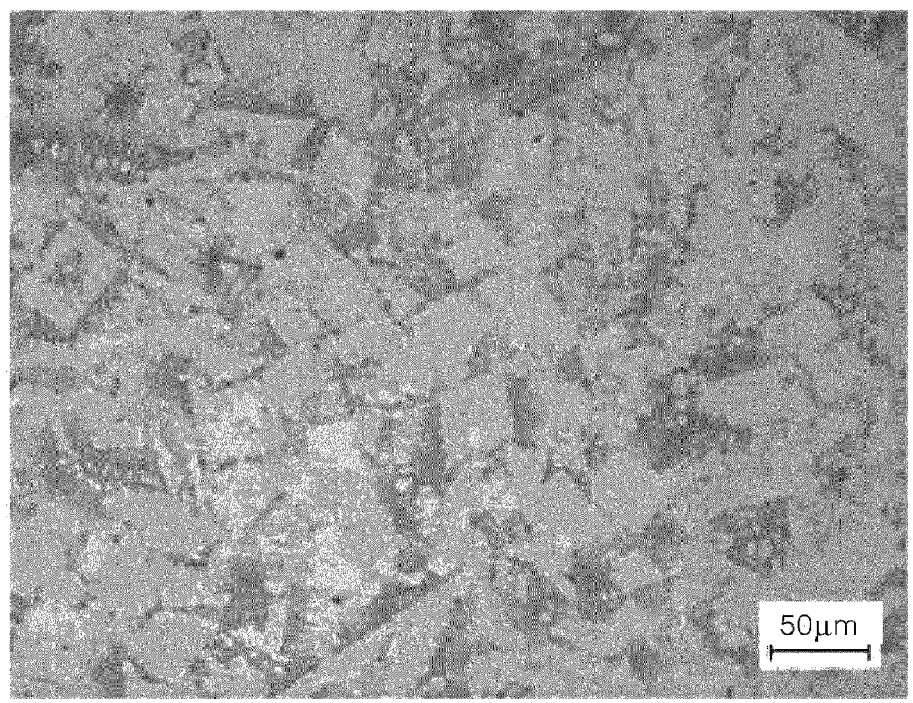
FIG. 16 shows the microstructure of the combined powder structure manufactured combined powder structure, according to an embodiment of the present invention.

10 weight % of a boron iron alloy powder was added to 90 weight % of iron powder, and then, heated to manufacture a powder mixture including boronized iron powder and de-boronized boron iron alloy powder. 45 weight % of the powder mixture, 45 weight % of self-fluxing alloy powder (B26 manufactured by Polema company), and 10 weight % borax ($Na_2B_4O_7 10H_2O$) acting as a flux, were mixed, and then, the mixture was loaded into a mold, followed by heating at a temperature of 1250° C. for 10 minutes to manufacture a combined powder structure. FIG. 16 shows the micro structure of the combined powder structure. Referring to FIG. 16, the micro structure includes an iron-boron compound (the white region of FIG. 16) and a martensite structure (the black region of FIG. 16). The combined powder structure was measured by using the Rockwell hardness tester, and a hardness value thereof was HRA 82.

As described above, according to the present invention, a combination having a very high hardness may be obtained by using a relatively inexpensive lower alloy element, and thus, applied parts may be used for a long period of time and also, consumption of expensive natural sources may reduce.

As another example, the powder mixture may be loaded into a pipe (or a steel pipe), and then, the pipe is heated while rotating to form a high-hardness coating layer formed of the combined powder structure on an inner surface of the pipe.

Figure 17:
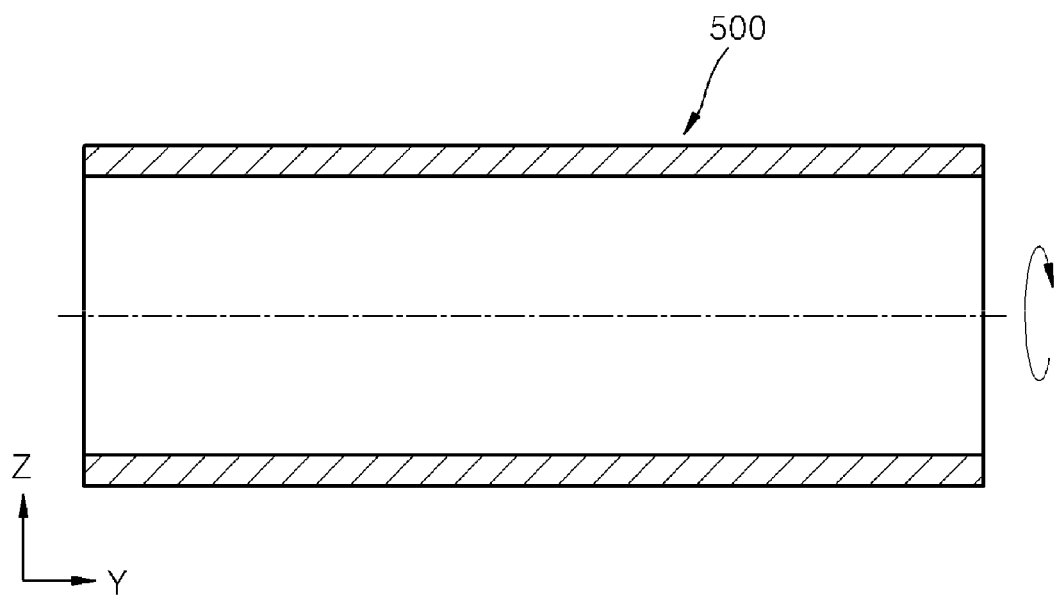
FIGS. 17 to 20 are schematic views of the steel pipe, according to an embodiment of the present invention.
Figure 18:
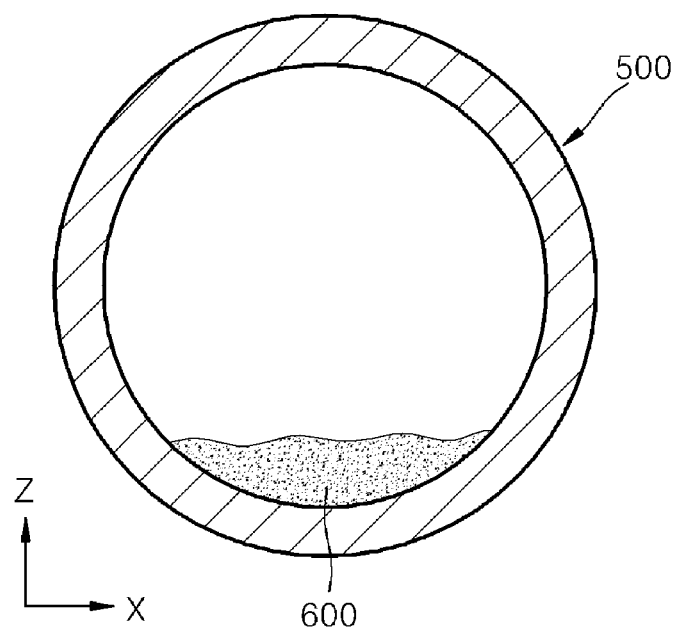
Figure 19:
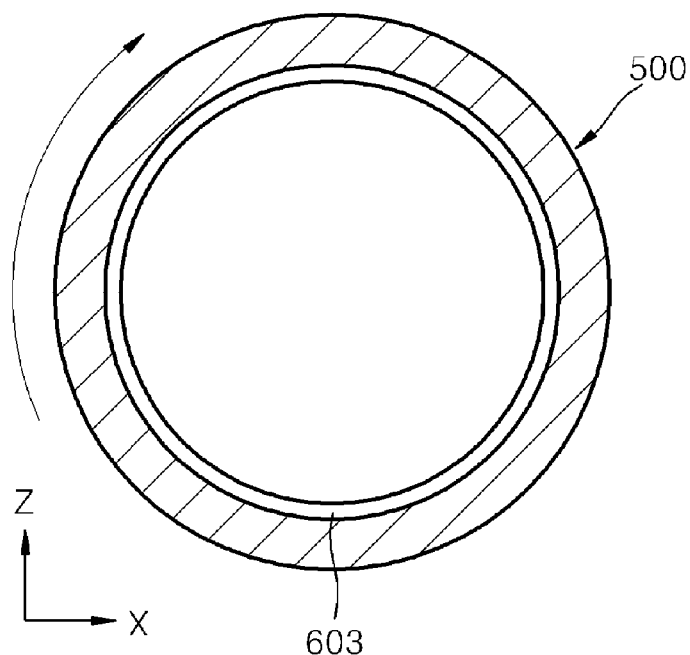
Figure 20:
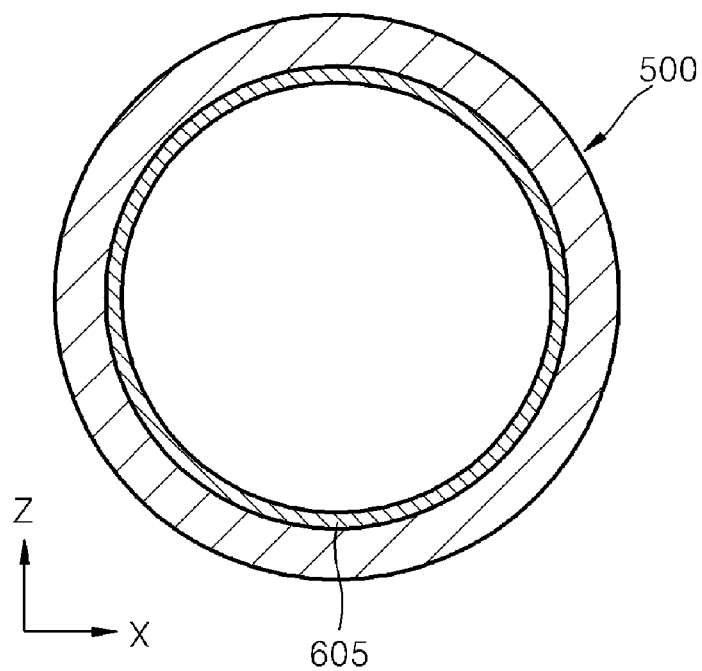

FIGS. 17 to 20 are cross-sectional views of a steel pipe 500 according to an embodiment of the present invention. In detail, FIG. 17 is a cross-sectional view of the steel pipe 500 perpendicular to the x direction. FIGS. 18 to 20 are cross-sectional views of the steel pipe 500 perpendicular to the y direction.

Hereinafter, referring FIGS. 17 to 20, a method of manufacturing the steel pipe 500 according to an embodiment of the present invention will be described according to an embodiment of the present invention.

FIG. 17 is a schematic view of the steel pipe 500 for manufacturing a steel pipe on which a coating layer is formed, according to an embodiment of the present invention. The steel pipe 500 may be rotated and heated by using a heating unit (not shown) before the powder mixture is loaded thereto. According to another embodiment of the present invention, a powder mixture 600 may be provided into the steel pipe 500 in advance before the heating, and the powder mixture 600 may include a boron iron alloy powder having at least a portion including a de-boronized region and a target powder having at least a portion including a boronized region.

In some embodiments, the boron iron alloy powder may not include the de-boronized region, and the target powder may not include the boronized region. In some embodiments, only at least one of the boron iron alloy powder and the target powder may not include the de-boronized region or the boronized region. In this case, de-boronizing of the boron iron alloy powder and/or boronizing of the target powder may be performed inside a steel pipe.

For example, in the case of the target powder does not include the boronized region, when the target powder and the boron iron alloy powder are heated while the target powder contacts the boron iron alloy powder, boron (B) may diffuse from the boron iron alloy powder to the target powder due to a chemical reaction to form a boronized region in the target powder, and while the target powder is boronized to form a boronized region, the boron iron alloy powder is de-boronized to form a de-boronized region, and the formation of the boronized region and the de-boronized region leads to a decrease in the melting points of the boron iron alloy powder and the target powder. The powder mixture 600 including the boron iron alloy powder having the de-boronized region and the target powder having the boronized region may be directly used without the separation of the boronized target powder.

The steel pipe 500 may have a hollow cylindrical pipe shape, and when heated by using the heating unit (not shown) while rotating, the powder mixture 600 may be partially or completely melted to form a molten layer 603 in a liquid phase, and the molten layer 603 may be attached to the inner surface of the steel pipe 500 due to a centrifugal force of the steel pipe 500 rotating as illustrated in FIG. 19, and then, the molten layer 603 is solidified by cooling to form a coating layer 605 inside the steel pipe 500. Based on the powder mixture 600, an amount of the boron iron alloy powder may be in a range of 5 weight % to 95 weight %, for example, 10 weight % to 90 weight %. Average particle sizes of the boron iron alloy powder and the target powder may be in a range of 200 mesh to 20 mesh, which are evaluated based on ASTM standard sieves.

The powder mixture inside the steel pipe 500 may further include, in addition to the boron iron alloy powder and the target powder, chromium iron alloy powder and/or a flux. The flux may prevent oxidation of the powder mixture when exposed to the atmosphere, and may also improve fluidity of the powder mixture. The flux may include at least one of $Na_2B_4O_7$, $NaSiO_3$, $NaHCO_3$, $H_3BO_3$, $B_2O_3$, CaSi, CaO, 3NaF, and $AlF_3$. The chromium iron alloy powder may include 2 weight % or more of carbon and 50 weight % or more of chromium. The chromium iron alloy powder consists of chromium, which is a major component, and iron and carbon, is inexpensive, and has a specific gravity that is similar to that of the boron iron alloy powder having low-melting point. Accordingly, the chromium iron alloy powder may be uniformly dispersed during casting, such as sintering or centrifugation casting.

In addition, the boron iron alloy powder having low-melting point may be manufactured by de-boronizing boron iron alloy powder, and the target powder having the low-melting point may include iron powder which is inexpensive. Furthermore, the target powder having the low-melting point may be replaced with a structure manufactured by boronizing waste shot ball and a cutting chip. A film or coating layer formed as described above may form a passive film due to high-concentration chromium to obtain as high hardness of HV1200, and also, a formed steel pipe may have wearing resistance properties, corrosion resistance properties, and excellent high-temperature oxidation property. In addition, since a waste material is used as a source material, natural source conservation and the prevention of environmental pollution may be achieved.

In the powder mixture including the chromium iron alloy powder, an amount of the chromium iron alloy powder may be in a range of 5 weight % to 95 weight %, and the chromium iron alloy powder may include at least one of iron, chromium, silicon, and carbon. An average particle size of chromium iron alloy powder particles may be in a range of 200 mesh to 4 mesh, which are evaluated based on ASTM standard sieves.

After the powder mixture 600 is provided into the steel pipe 500, ends of the steel pipe 500 are covered by using a cover member (not shown), and then, the steel pipe 500 is rotated and heated. The number of rotation of the steel pipe 500 may be determined according to Equation 3 below.

$$\text{The number of rotation} = [G \times 10^7 / 5.6 \times \text{inner diameter of steel pipe (mm)}]^{1/2} \quad \text{(Equation 3)}$$

wherein G may be obtained by using Equation 4 below $$G = \text{centrifugal force/gravity } 5.6 \times 10^{-7} \times \text{inner diameter of steel pipe (mm)} \times \text{the number of rotation (rpm)}^2 \quad \text{(Equation 4)}$$

The rotational rate applied when a coating layer according to an embodiment of the present invention is formed may vary within 5G to 120G according to the composition ratio of the powder mixture. When the centrifugal force is 5 or less times smaller than a gravitational acceleration, the centrifugal force is not enough to perform an appropriate centrifugal casting, and when the centrifugal force is 120 or more times greater than a gravitational acceleration, excess force is unnecessarily applied.

Then, the powder mixture 600 in the steel pipe 500 may be heated to a temperature that is higher than the melting point of the powder mixture 600 to form the coating layer 605 having a high hardness. To form the coating layer 605, the powder mixture 600 may be melted and then solidified. First, to melt the powder mixture 600, for example, a heating member, such as a gas combustion heating, an electric resistance heating, or a high-frequency induction heating, may be used, and the heating member may be any one of various heating members that generate heat provided to the outer circumference surface of the steel pipe 500. The heating temperature may be lower than the melting point of the steel pipe 500, for example, may be in a range of 1000° C. to 1500° C.

When the steel pipe 500 is rotated and heated, the powders of the powder mixture 600 may be uniformly mixed and also, the heat supplied by using the heating member may be uniformly provided to the powder mixture 600. When the powder mixture 600 is heated above the melting point thereof, the powder mixture 600 may be partially or completely melted and thus, the molten layer 603 is formed on the inner surface of the steel pipe 500. The liquid phase formed by melting at least one of the boron iron alloy powder may surround the boronized target powder to allow the target powder particles to combine each other. In some embodiments, at least one of the target powder may be melted to increase a binding force between the target powder and the boron iron alloy powder.

Figure 21:
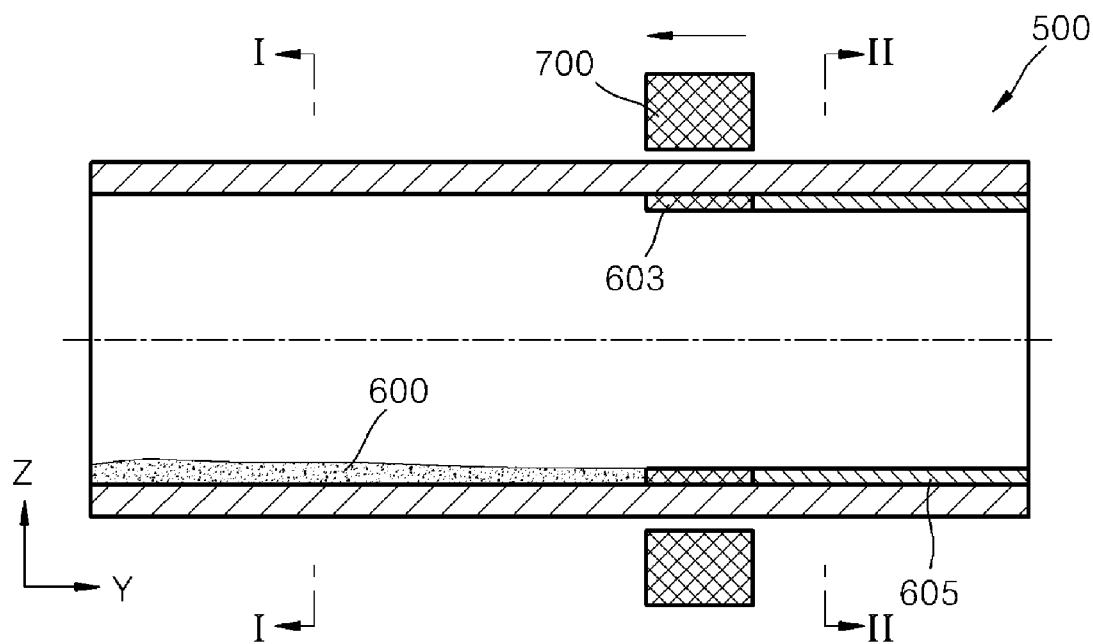
FIG. 21 is a schematic view illustrating a method of manufacturing a steel pipe, according to an embodiment of the present invention.

FIG. 21 is a schematic view illustrating a method of forming a steel pipe according to an embodiment of the present invention.

Referring to FIG. 21, a high frequency induction heating may be used as a heating member for forming the coating layer 605 in the steel pipe 500. A high-frequency induction heater 700 may be surrounded by coils, and at least one high-frequency induction heater 700 may surround at least a portion of the outer circumference surface of the steep pipe.

For example, one high-frequency induction heater is disposed on a side of the steel pipe 500 in the +z direction, and the other high-frequency induction heater is disposed on the opposite side, that is, −z direction such that the high-frequency induction heaters face each other. According to another embodiment of the present invention, the high-frequency induction heater 700 may be integrally disposed along the entire outer circumference surface of the steel pipe 500 in the circumference direction thereof. According to another embodiment of the present invention, a plurality of high-frequency induction heaters 700 may be disposed being spaced apart from each other along the outer circumference surface of the steel pipe 500 in the circumference direction thereof. The high-frequency induction heaters 700 may locally supply heat, and may be connected to a moving unit (not shown) and movable in ±y directions, which is a lengthwise direction of the steel pipe 500.

In such a method in which the high-frequency induction heaters 700 are used as a heating unit to form the coating layer 605 inside the steel pipe 500, first, a powder mixture 600 including a boron iron alloy powder, a target powder, and at least one of chromium iron alloy powder and a flux is loaded into the steel pipe 500. The powder mixture 600 may be uniformly loaded in ±y directions of the steel pipe 500.

The steel pipe 500 may be rotatable, and may be rotated before or after the supply of the powder mixture 600. When the powder mixture 600 is uniformly mixed while the steel pipe 500 rotates, the steel pipe 500 may be locally heated while the high-frequency induction heaters 700 are moved from one side of the steel pipe 500 (+y direction) to the other side (−y direction). In this case, the high-frequency induction heaters 700 may has a frequency number of 300 Hz to 5 kHz and may apply electric powder to coils to heat at a melting point of the powder mixture 600, that is, from 1000° C. to 1500° C.

A view of a cross-section taken along a line I-I of FIG. 21 is shown in FIG. 18, and a view of a cross-section taken along a line II-II of FIG. 21 is shown in FIG. 19.

As illustrated in the drawings, the powders of the powder mixture 600 may be uniformly mixed inside the steel pipe 500 due to the rotation of the steel pipe 500, thereby lying down. When high-frequency induction heating is performed thereon, at least a portion of the powder mixture 600 inside the steel pipe 500 corresponding to at least a portion of the steel pipe 500 near the heating unit may be locally heated and melted to form the molten layer 603 of which at least a portion has a liquid phase on the steel pipe 500. The molten layer 603 may be attached to the inner surface of the steel pipe 500 when the steel pipe 500 rotates, and a portion of the molten layer 603 on which the high-frequency induction heaters 700 have passed may be solidified to form the coating layer 605.

Unlike the local heating described above for forming the coating layer 605, the steel pipe 500 may be completely heated to melt the powder mixture 600, and then, when powders are partially or completely melted to combine with each other, the heating of the steel pipe 500 may be stopped or a heating member may be removed, and thus, the steel pipe 500 is naturally cooled. When the cooling is performed while the steel pipe 500 rotates, a portion of the powder mixture 600 directly contacting the steel pipe 500 may begin to be solidified and a portion of the powder mixture 600 that is the farthest from the steel pipe 500 is solidified at last, thereby forming the coating layer 605 having a high hardness. A separate cooling device (not shown) may be used to solidify metal quickly.

In addition, to improve wearing, lubrication, and oxidation properties, in forming the coating layer 605, the powder mixture 600 may be partially or completely melted, and the molten metal is provided into the steel pipe 500, and melted by heating, and then, cooled while rotating.

The coating layer 605 formed of the iron-boron alloy manufactured as described above may have a low melting point and high wettability. In addition, there is no need to further add various elements to obtain such property. Examples of such added elements are tungsten carbide (WC), vanadium (V), cobalt (Co), molybdenum (Mo), nickel (Ni), boron (B), silicon (Si), and carbon (C). Accordingly, additional costs doe not incur, and simultaneously, a high hardness capability may be obtained, and thus, a very high hardness and strength may be obtained without a separate heat treatment. In addition, since the melting point of the powder mixture 600 is relatively reduced due to de-boronizing and boronizing, the coating layer 605 may be formed at a lower temperature, and due to the increase in fusing property between powders, a formed combined powder structure may have a stronger binding force.

FIG. 20 is a cross-sectional view of the steel pipe 500 according to an embodiment of the present invention, which is perpendicular to the y direction. The steel pipe 500 according to the present embodiment of the present invention will be described in detail in connection with FIG. 20.

On the steel pipe 500, as described above, a boron iron alloy powder having at least a portion that has a de-boronized region and a target powder having at least a portion that has a boronized region are melted and solidified to form the coating layer 605. The coating layer 605 may be formed in such a manner that the boron iron alloy powder acting as a matrix metal or a binder and having at least a portion that includes a de-boronized region, and the target powder having at least a portion that includes a boronized region are melted by heating and then cooled to be solidified.

At least a portion of the boron iron alloy powder is melted to directly contact and surround the target powder.

The coating layer 605 disposed on the inner surface of the steel pipe 500 may further include, as a reinforcing agent, pellet chromium iron alloy. Due to the inclusion of chromium iron alloy, a high hardness may be obtained, and due to chromium having excellent wearing resistance properties and a high concentration, a passive film may be obtained. Since chromium has a specific gravity that is similar to that of the boron iron alloy powder, chromium may be uniformly dispersed in the coating layer, excellent corrosion resistance properties and high-temperature oxidation property may be obtained to, for example, effectively prevent wear formed by gravel and sand of concrete slurry transported under high pressure in the steel pipe.

The reinforcing agent may include 10 weight % to 80 weight % of chromium, 2 weight % to 10 weight % of carbon, 2.5 weight % or less of silicon, and iron (as a balance), and the binder may include 5 atomic % to 35 atomic % of boron. The binder may include iron and boron, and the reinforcing agent may include at least one of iron, chromium, silicon, and carbon.

As described above, a material for forming a coating layer disposed on the inner surface of a steep pipe having wearing resistance properties may be at least one of iron, chromium, silicon, carbon, and boron. For example the coating layer may include 10 weight % or less of boron, 60 weight % or less of chromium, 10 weight % or less of carbon, and 2.5% or less of silicon.

In addition, the boron content of the coating layer may be 10 weight % or less (greater than 0). Due to the inclusion of boron, the melting point of the binder may be decreased and a hardness thereof may be increased. However, when the boron content exceeds 10 weight %, bubbles may be formed in a coating layer during melting and solidifying, and a boron compound may be formed to increase brittleness of the coating layer may be increased.

Due to the inclusion of chromium in the coating layer, high hardness, wearing resistance properties, corrosion resistance properties, and excellent high-temperate oxidation property may be obtained. However, when the amount of chromium exceeds 60 weight %, the composition ratio of the binder decreases, leading to a decrease in a molten binding force. In addition, when a great amount of chromium is added, brittleness may be induced, and simultaneously, the increase in hardness may be decreased. Accordingly, chromium may be used in an amount of 60 weight % or less.

Carbon may be added to the coating layer to decrease the melting point of the coating layer and to form a chromium carbide to obtain a high hardness, that is, excellent wearing resistance properties. When the amount of carbon exceeds 10 weight %, effects thereof are negligible. Accordingly, carbon may be added in an amount of 10 weight % or less (greater than 0). In addition, an amount of silicon added to the coating layer may be 2.5 weight % or less (greater than 0), and when silicon has such an amount, the melting point may be decreased and deoxidation effects may be obtained without a decrease in mechanical properties.

Hereinafter, experimental examples are provided to help understanding of the present invention. However, the experimental examples are provided herein for illustration purpose only, and the present invention is not limited thereto.

Experimental Example 5

Table 1 shows chemical components and hardness of a coating layer according to a mixed ratio of powders used to manufacture a steel pipe according to an embodiment of the present invention.

TABLE 1

| Coating layer | Powder mixture (weight %) | | Chemical components of the coating layer | | | | | | Hardness (HV) |
|---|---|---|---|---|---|---|---|---|---|
| | Boron (B) Surface alloy Shot ball | Boron (B) Surface alloy Pure iron powder | Fe—Cr | Cr | Si | B | C | Fe | |
| Sample 1 | 100 | — | — | — | 0.25 | 1.85 | 0.42 | Bal. | 950 |
| Sample 2 | 75 | — | 25 | 14.5 | 0.74 | 1.45 | 2.45 | Bal. | 1000 |
| Sample 3 | 50 | — | 50 | 28.5 | 1.45 | 0.94 | 4.55 | Bal. | 1200 |
| Sample 4 | 25 | — | 75 | 39.5 | 2.25 | 0.55 | 5.52 | Bal. | 1200 |
| Sample 5 | — | 100 | — | 0.2 | 1.75 | 0.18 | Bal. | 875 |
| Sample 6 | — | 75 | 25 | 13.5 | 0.55 | 1.25 | 2.25 | Bal. | 985 |
| Sample 7 | — | 50 | 50 | 29.5 | 0.35 | 0.85 | 4.25 | Bal. | 1150 |
| Sample 8 | — | 25 | 75 | 40.5 | 2.15 | 0.65 | 4.95 | Bal. | 1100 |

Referring to Table 1, Samples 1 to 4 that are boron (B)-surfaced alloy shot balls were manufactured by mixing 10 weight % of a boron iron alloy powder and 90 weight % of shot ball, followed by boronizing and de-boronizing at a temperature of 950° C. for 3 hours, and Samples 5 to 8 that are boron (B)-surfaced alloy pure iron powder were manufactured by mixing 10 weight % of the boron iron alloy powder and 90 weight % of pure iron powder, followed by boronizing and de-boronizing at a temperature of 950° C. for 3 hours.

Sample 1 is a coating layer formed by using the boron (B)-surfaced alloy shot ball, and Samples 2 to 4 are coating layers formed at mixed ratios of the boron (B)-surfaced alloy shot ball and the chromium iron alloy powder of 3:1, 1:1, and 1:3 as shown in Table 1, respectively. Sample 5 is a coating layer formed by using boron (B)-surfaced alloy pure iron powder, and similarly, Samples 6 to 8 are coating layers formed at mixed ratios of the boron (B)-surfaced alloy pure iron powder and chromium iron alloy powder of 3:1, 1:1, and 1:3 as shown in Table 1, respectively. Samples 1 to 4 and Samples 5 to 8 were all manufactured by molten-heating by using an induction heating device while rotating at 30G at a temperature of 1250° C., followed by solidifying.

Figure 22:
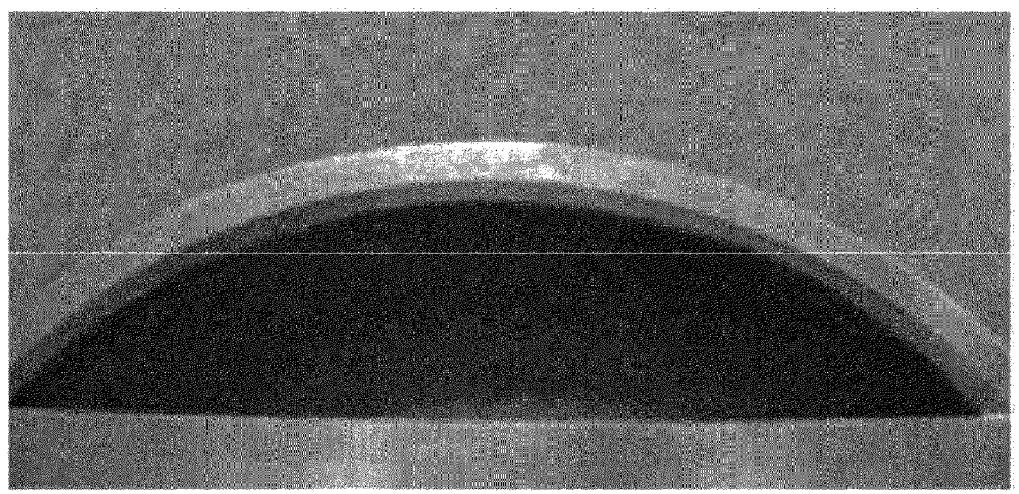
FIG. 22 is a cross-sectional view of a portion of the steel pipe, according to an embodiment of the present invention.
Figure 25:
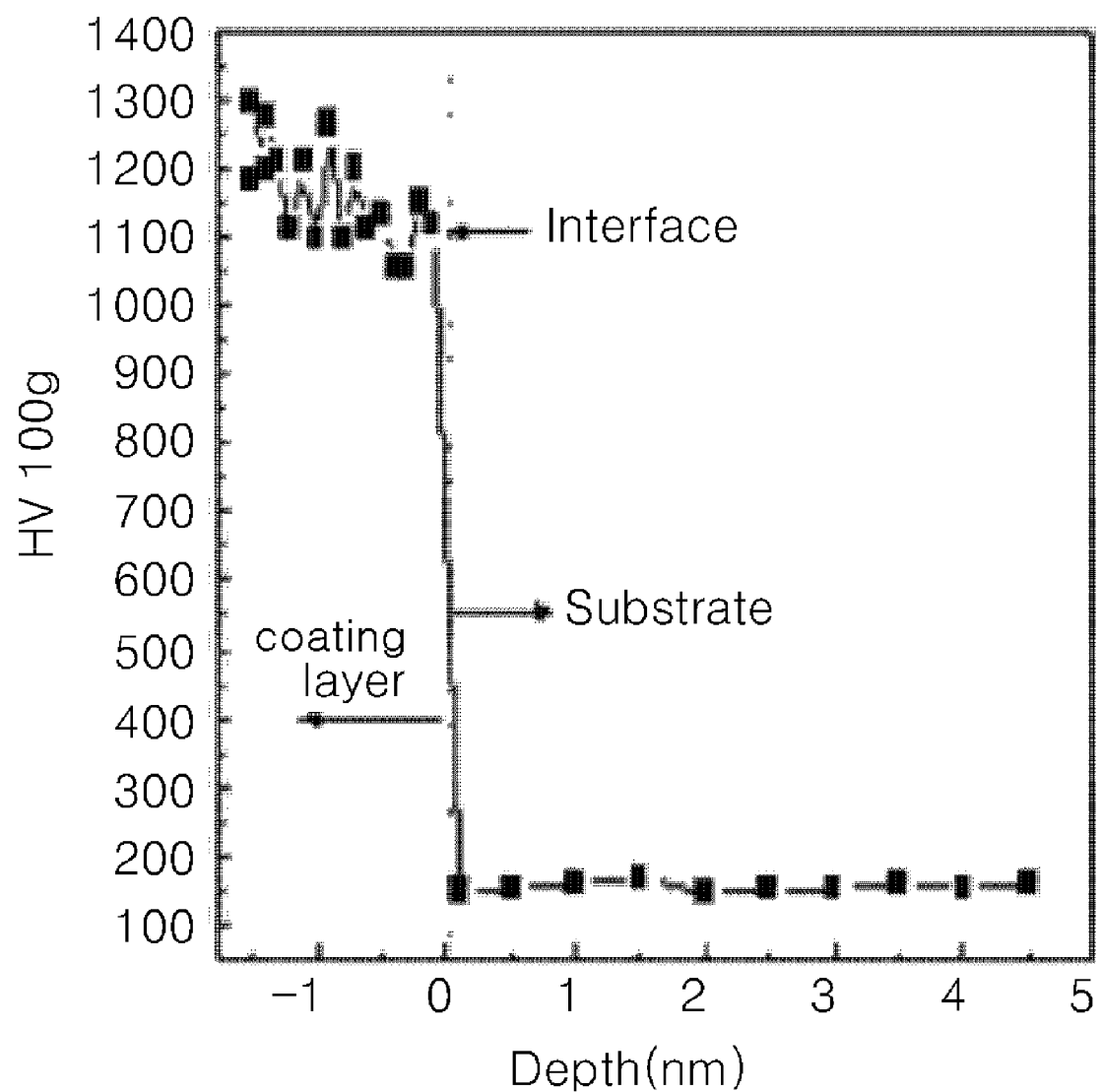

FIG. 22 shows a picture of a cross-section of a steel pipe with a coating layer formed therein, and as shown in FIG. 25, it was confirmed that a coating layer (dark gray) was formed inside a steel pipe (gray).

Referring to Table 1, the hardness of Samples 1 to 8 was all very high of HV800 to HV1200, and due to the inclusion of chromium iron alloy powder, the hardness was further increased.

Figure 23:
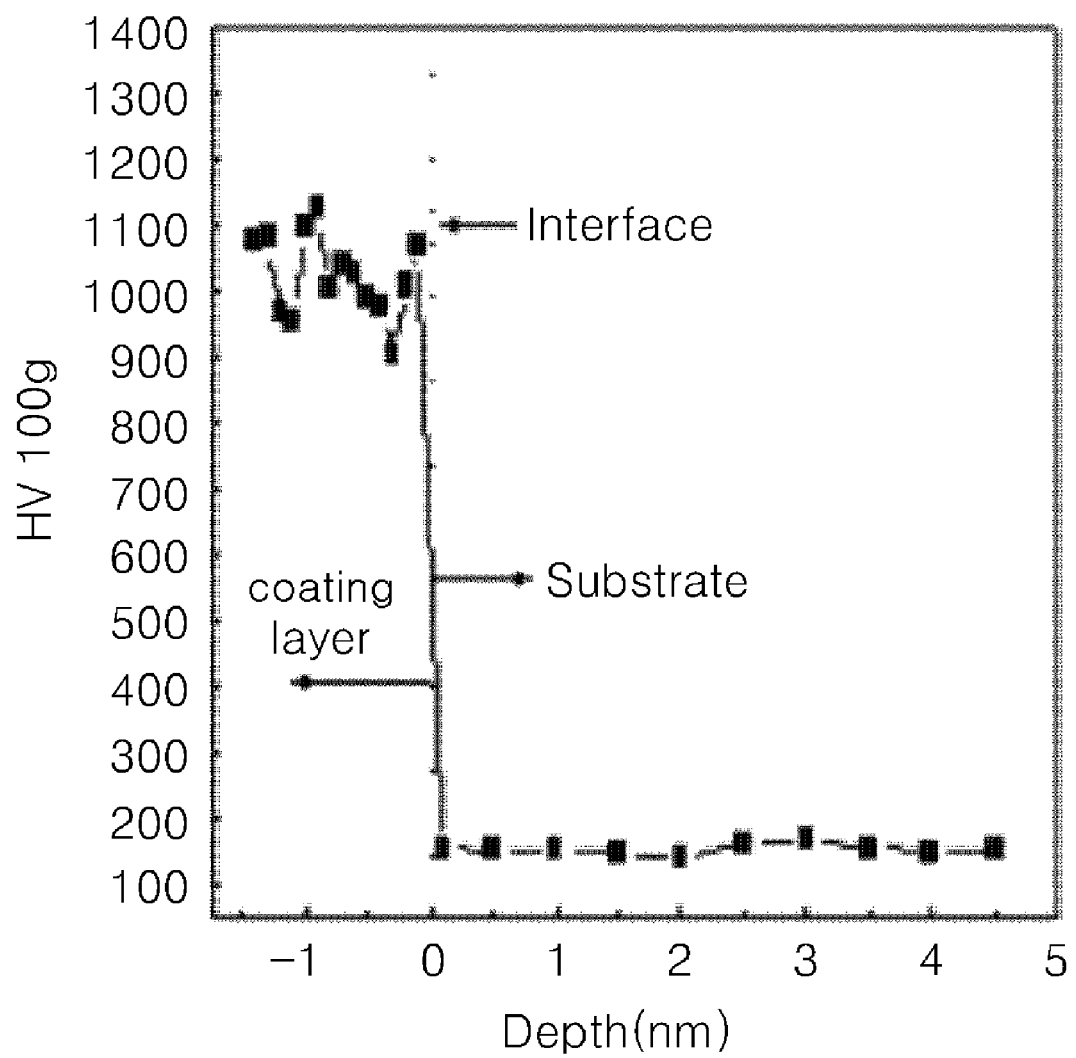
FIGS. 23 to 25 are graphs of hardness of a cross-section of the coating layer formed, according to an embodiment of the present invention.
Figure 24:
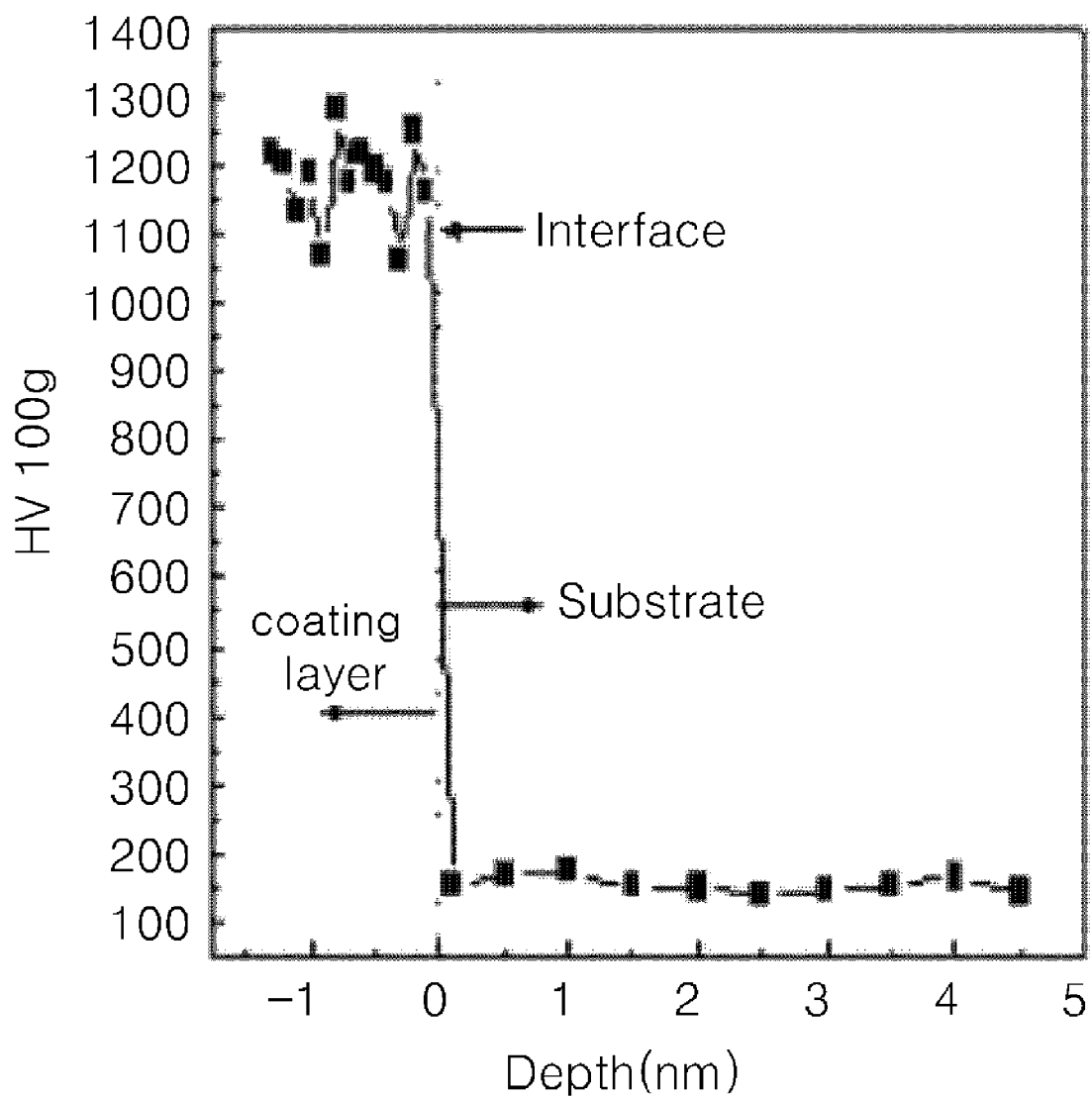

FIGS. 23 to 25 are graphs of the hardness of a cross-section of a coating layer formed inside a steel pipe according to an amount of the chromium iron alloy powder, and FIG. 23 is a graph of Sample 2, FIG. 24 is a graph of Sample 3, and FIG. 25 is a graph of Sample 4.

As shown in Table 1 and FIGS. 23 to 25, when 25 weight % of chromium iron alloy powder was added, the hardness was HV1000, which is higher than when chromium iron alloy was not added by about 50. When chromium iron alloy powder was added in an amount of 50 weight %, the hardness was as high as HV1200, and even when in an amount of 75 weight %, such a high hardness was obtained.

Figure 26:
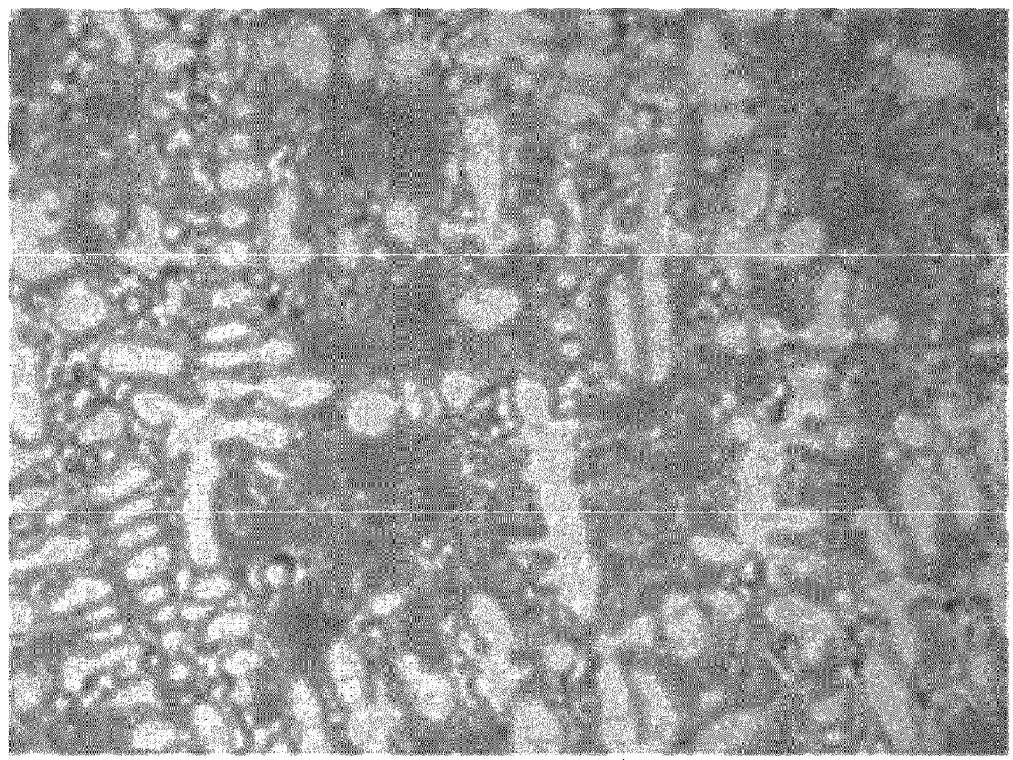
FIGS. 26 to 28 show the micro-structure of the coating layer formed, according to an embodiment of the present invention.
Figure 27:
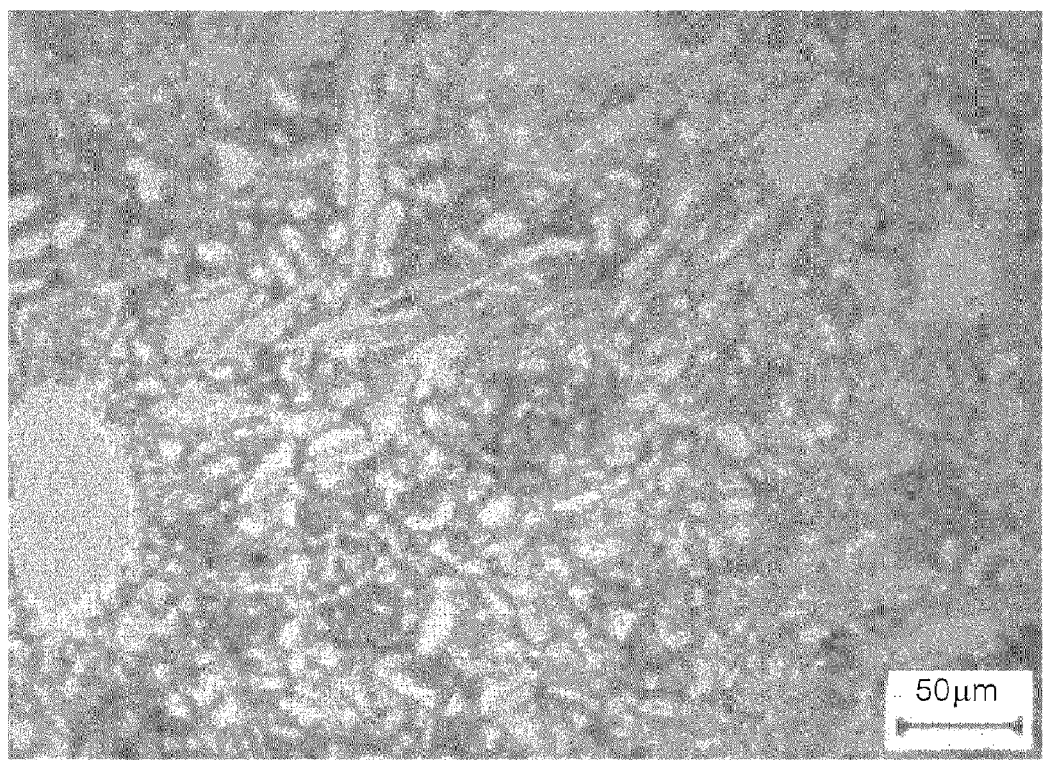
Figure 28:
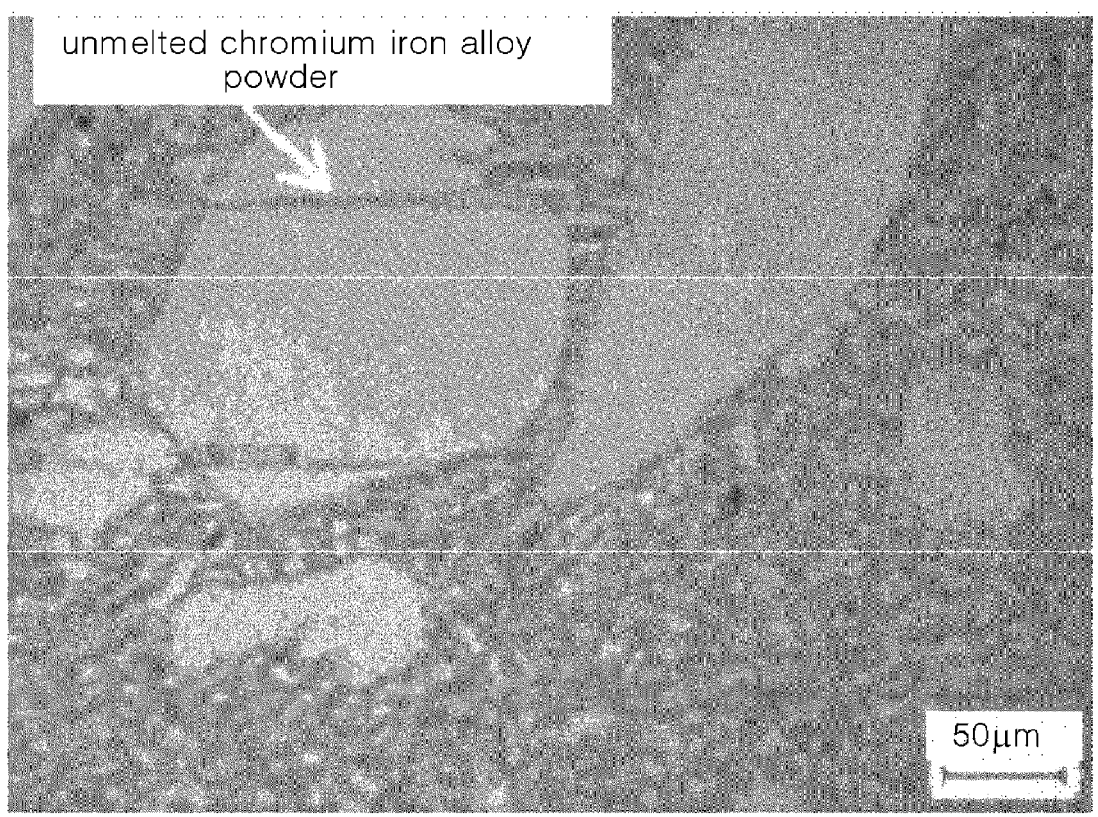

FIGS. 26 to 28 show a micro structure of a coating layer inside a steel pipe according to an amount of chromium iron alloy powder, and FIG. 26 shows the micro structure of Sample 2 and FIG. 27 shows the micro structure of Sample 3. From these drawings, it was confirmed that micro chromium iron alloy particles (light gray) were formed on a matrix. In addition, FIG. 28 shows a micro structure of Sample 4, and when chromium iron alloy powder was added thereto in an amount of 75 weight %, large chromium iron alloy powder particles that were not dissolved existed. That is, due to the inclusion of chromium iron alloy powder, the resultant structure has smaller particles, and due to the presence of high-hardness molten chromium iron alloy, hardness was increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of manufacturing a boron alloy powder mixture, the method comprising:
   preparing a mixed powder including a boron iron alloy powder and a target powder; and
   heat treating the mixed powder to form a boronized region in the target powder by boronizing at least a portion of the target powder and to form a de-boronized region in the boron iron alloy powder by de-boronizing at least a portion of the boron iron alloy powder, thereby reducing the melting point of the boron iron alloy powder.

2. The method of claim 1, wherein a boron content in the boron iron alloy powder before the de-boronizing is 17 atomic % or more.

3. The method of claim 1, wherein a boron content in the boron iron alloy powder after the de-boronizing is in a range of 5 atomic % to 35 atomic %.

4. The method of claim 3, wherein a boron content in the boron iron alloy powder in the mixed powder after the de-boronizing is in a range of 10 atomic % to 25 atomic %.

5. The method of claim 1, wherein the target powder includes a metal that forms a solid solution with boron or that combines with boron to form a boron compound.

6. The method of claim 5, wherein the metal is at least one selected from iron (Fe), titanium (Ti), chromium (Cr), zirconium (Zr), hafnium (Hf), vanadium (V), tantalum (Ta), molybdenum (Mo), nickel (Ni), cobalt (Co), aluminum (Al), silicon (Si), and tungsten (W).

7. The method of claim 1, wherein a melting point of the boronized region in the target powder is less than a melting point of the target powder before the boronizing.

8. The method of claim 1, wherein an amount of the boron iron alloy powder in the mixed powder is in a range of 5 weight % to 95 weight %.

* * * * *